United States Patent
Veltman

(10) Patent No.: US 11,890,945 B2
(45) Date of Patent: Feb. 6, 2024

(54) ELECTRIC MULTI-MODE DRIVE SYSTEM AND METHOD FOR OPERATING THE SAME, A TRACK AND A VEHICLE FOR USE IN SUCH A DRIVE SYSTEM

(71) Applicant: ENGIE ELECTROPROJECT B.V., Zaandam (NL)

(72) Inventor: André Veltman, Culemborg (NL)

(73) Assignee: ENGIE ELECTROPROJECT B.V., Zaandam (NL)

( * ) Notice: Subject to any disclaimer, the term of this patent is extended or adjusted under 35 U.S.C. 154(b) by 421 days.

(21) Appl. No.: 17/297,068

(22) PCT Filed: Nov. 27, 2019

(86) PCT No.: PCT/EP2019/082795
§ 371 (c)(1),
(2) Date: May 26, 2021

(87) PCT Pub. No.: WO2020/109416
PCT Pub. Date: Jun. 4, 2020

(65) Prior Publication Data
US 2022/0032781 A1 Feb. 3, 2022

(30) Foreign Application Priority Data

Nov. 27, 2018 (EP) .................................... 18208550

(51) Int. Cl.
| | | |
|---|---|---|
| *B60L 13/03* | (2006.01) | |
| *B60L 13/04* | (2006.01) | |
| *B60L 15/20* | (2006.01) | |
| *B60L 50/60* | (2019.01) | |
| *B60L 9/16* | (2006.01) | |
| *H02J 50/12* | (2016.01) | |
| *B60L 50/40* | (2019.01) | |

(Continued)

(52) U.S. Cl.
CPC ................. *B60L 13/03* (2013.01); *B60L 9/16* (2013.01); *B60L 13/04* (2013.01);
(Continued)

(58) Field of Classification Search
CPC .. B60L 13/03; B60L 50/60; B60L 9/16; B60L 13/04; B60L 15/2009;
(Continued)

(56) References Cited

U.S. PATENT DOCUMENTS

2011/0184601 A1* 7/2011 Shapery ................. B60L 5/005
191/10

FOREIGN PATENT DOCUMENTS

EP 2535219 A1 12/2012

OTHER PUBLICATIONS

Tuyeras et al. (EP 2535219 A1) Power Recharging Device For A Vehicle Date Published Dec. 19, 2012 (Year: 2012).*
(Continued)

*Primary Examiner* — Jorge L Carrasquillo
(74) *Attorney, Agent, or Firm* — Suiter Swantz pc llo

(57) ABSTRACT

An electric multi-mode drive system (400), a method for operating the same, a vehicle (110) and a track (401). The system is arranged for operating at one part (402) of the track (401), at a station (410; 411), an electric Linear Doubly Fed Motor, LDFM, (310) for launching the vehicle (110), and for operating at another part (403) of the track (401), between stations (410; 411), a further electric motor (320; 330; 340; 350), not an LDFM, arranged for at least one of accelerating, coasting and restarting movement of the vehicle (110) after launching. Electric power for operating the further electric motor (320; 330; 340; 350), is provided by an on-board rechargeable electrical energy storage device. With the LDFM (310), sufficient power is generated
(Continued)

for accelerating the vehicle (110), and recharging the on-board electrical energy storage device during standstill, braking and/or launching.

13 Claims, 14 Drawing Sheets

(51) Int. Cl.
  *H02J 50/40* (2016.01)
  *B61B 13/10* (2006.01)
(52) U.S. Cl.
  CPC ....... *B60L 15/2009* (2013.01); *B60L 15/2045* (2013.01); *B60L 50/60* (2019.02); *B60L 50/40* (2019.02); *B61B 13/10* (2013.01); *H02J 50/12* (2016.02); *H02J 50/402* (2020.01)
(58) Field of Classification Search
  CPC ...... B60L 15/2045; B60L 50/40; H02J 50/12; H02J 50/402; B61B 13/10
  USPC .......................................................... 318/135
  See application file for complete search history.

(56) References Cited

OTHER PUBLICATIONS

Donoghue, John F. et al., "Constant Power Acceleration Profiles for Electric Vehicles", IEEE Transactions on Industrial Electronics, vol. IE-34, No. 2, May 1, 1987, pp. 188-191.
Denke, C. et al., "Advanced convoy control strategy for autonomously driven railway vehicles", 2006 IEEE Intelligent Transportation Systems Conference (Toronto, Ontario, Canada, Sep. 17-20, 2006), Sep. 20, 2006, pp. 1388-1393.
Henke, Markus et al., "Control of the NBP liner drive system", Control Engineering Practice, vol. 10, No. 9, Sep. 1, 2002, pp. 1029-1035.
International Search Report dated Mar. 2, 2020 for PCT/EP2019/082795.
Kolomeitsev, L. et al., "Linear switched reluctance motor as a high efficiency propulsion system for railway vehicles", Power Electronics, Electrical Drives, Automation and Motion, 2008, SPEEDAM 2008, International Symposium, IEEE, Piscataway, NJ, Jun. 11, 2008, pp. 155-160.
Post, Richard F., "Maglev: A New Approach", Scientific American, Jan. 2000, 8 pages.
Written Opinion dated Mar. 2, 2020 for PCT/EP2019/082795.

\* cited by examiner

ELECTRIC MULTI-MODE DRIVE SYSTEM AND METHOD FOR OPERATING THE SAME, A TRACK AND A VEHICLE FOR USE IN SUCH A DRIVE SYSTEM

TECHNICAL FIELD

The present disclosure generally relates to an electric transport system and, in particular, to an electric multi-mode drive system for electrically driving a vehicle along a track, a method of operating such an electric multi-mode drive system for driving a vehicle, as well as a vehicle and a track for operating the electric multi-mode drive system.

BACKGROUND

An electric transport system, for moving a vehicle along a track from one station to another for boarding and de-boarding of the vehicle, requires electric driving equipment for propulsion, coasting and braking of the vehicle, and in case of a magnetic suspension transport system, also for levitation and guidance of the vehicle. The propulsion or launching equipment should be arranged for accelerating the vehicle in a reasonable short time to reach an envisaged coasting speed. The coasting equipment is required for moving the vehicle over a distance while travelling at the coasting speed. In practice, a braking system is arranged for decelerating the vehicle in an energy efficient manner.

Various types of electric motors may be used for driving vehicles in such an electric transport system, among which linear electric motors, including Linear Synchronous Motors, LSMs, Linear Synchronous Reluctance Motors, LSReIMs, Linear Induction Motors, LIMs, and Linear Doubly Fed Motors, LDFMs. Instead of electric linear motors, vehicles transported on wheels may be driven by electric rotary motors, such as Rotary Induction Motors, RIMs, Rotary Synchronous Motors, RSMs, and the like.

In recent years, levitation transport systems have been developed, involving electric linear motors of long-stator design with passive vehicles and active tracks. In the publication "Advanced Convoy Control Strategy for Autonomously Driven Railway Vehicles", by C. HENKE, et al., 2006 IEEE Intelligent Transportation Systems Conference: Toronto, Ontario, Canada, 17 Sep. 2006, pages 1388-1393, an electric railway transport system is disclosed, wherein the vehicle comprises an on-board electric power source for operating an LDFM.

These systems require over the entire travelling distance powered tracks, which is much more expensive than a pair of steel rails, for example. Levitation trains further face problems in accelerating the vehicle(s) from standstill to a coasting speed within a short time, in supplying power to the vehicle or track to maintain the speed during coasting, and in bringing the vehicle to a stop at a predefined position.

Accordingly, there is a need for an electric drive system and a method of operating such an electric drive system, for propelling or launching a vehicle or a train of vehicles in a relatively short period of time from standstill at a first station to a required driving speed along a track, to maintain the driving speed, and to bring the vehicle to a complete stop at a predefined position at a second station remote from the first station along the track, and this all in a cost and energy effective way, preferably with minimum losses and against minimum costs.

SUMMARY

The above mentioned and other objects are achieved, in a first aspect of the present disclosure, by an electric multi-mode drive system comprising a vehicle and a track, the track running from a first station to a second station remote from the first station, the first and second station arranged for at least one of boarding and de-boarding of the vehicle, the vehicle comprising an on-board rechargeable electrical energy storage device, wherein the vehicle and a first part of the track at the first and second station are arranged operating an electric Linear Doubly Fed Motor, LDFM, for launching the vehicle for moving along the track and charging the on-board energy storage device of the vehicle, and wherein the vehicle and a second part of the track between the first and second station are arranged operating a further electric motor different from an LDFM for at least one of accelerating, coasting and restarting movement of the vehicle for moving along the track after launching.

The present disclosure is based on the insight that the electric power for coasting a vehicle can be efficiently provided by an on-board electrical energy storage device of the vehicle, operating the further electric motor for driving the vehicle, while this further electric motor is designed for restarting movement of the vehicle in case of an unplanned standstill along the track between stations, for example in case of an emergency. This further electric motor may be advantageously designed for additionally accelerating the vehicle after launching and also after restarting thereof.

The required launching power for starting and accelerating the vehicle at the start of a journey, or after a standstill at an intermediate stop at a station for loading and unloading passengers and goods, is provided by an LDFM. Advantageously, the operation of the LDFM can be controlled for contactless recharging of the on-board electrical energy storage device of the vehicle during standstill, braking and/or launching thereof at a station.

Hence, the electric multi-mode drive system according to the present disclosure is arranged for operating in a first mode of operation at a first part of the track at a station comprising an LDFM, and is arranged for operating in a second mode of operation at a second part of the track between stations comprising a further motor, not being an LDFM.

For the purpose of launching and braking of the vehicle, it is sufficient to have the first or active track part of the LDFM arranged extending over a distance at stations where passengers board and de-board the vehicle, or loading and de-loading of goods takes place. As the further electric motor provides the driving power for coasting, the cost of the active track part of the disclosed multi-mode drive system can be kept much lower compared to a prior art levitation transport system, for example, requiring an active track along the entire length thereof. Hence, the combination of the two types of motors makes it possible to operate the vehicle at both a cost and energy effective way.

In accordance with an embodiment of the present disclosure, the vehicle comprises an on-board electric coil and converter assembly electrically connected to the electrical energy storage device, and the first part of track comprises a stationary electric coil and converter assembly extending along a length of the first part of the track, the two assemblies together arranged for operating and comprising the LDFM.

The vehicle is a so-called active vehicle, with the on-board electric coil operating as a moving stator or short stator, arranged for magnetically interacting with the stationary electric coil extending along a so-called active part of the track, that is the first part of the track, operating as a long stator. The coiled short and long stators operate in combination as a transformer having a movable secondary winding, which makes the contactless charging of the on-board electrical energy storage device possible. An LDFM enables fast-charging of the on-board electrical energy storage device of the vehicle, thereby stacking sufficient electrical energy for powering the further electric motor during a certain travelling distance along the second part of the track.

In accordance with an embodiment of the present disclosure, the vehicle and the second part of the track are arranged operating the further electric motor comprising an electric Linear Synchronous Reluctance Motor, LSReIM.

In this embodiment, the LSReIM may be used to generate considerable thrust in case the vehicle needs to restart from a position somewhere along the track where only an LSReIM drive is present. Moreover, the LSReIM is able to control the magnetic flux over a wide range, thereby beneficially enabling operation with a constant power consumption or power generation in the vehicle, which provides for lowest required power storage and converter weight.

In accordance with an embodiment of the present disclosure, wherein the vehicle comprises an on-board electric coil and converter assembly, the second part of the track comprises a structure of alternating segments having different magnetic properties extending along a length of the second part of the track, the on-board electric coil and converter assembly and the segments arranged comprising the LSReIM.

It will be appreciated that the on-board electric coil and converter assembly of the vehicle may be the same for both LDFM and LSReIM operation. The on-board coil interacts with different track parts to form different types of linear motors. In the LSReIM, the second part of the track is of a passive solid structure, i.e. without an electrically powered coil, having a varying thickness along the length of the track, which allows the on-board coil of the vehicle to experience position dependent inductance values, for generating thrust. This second part of the vehicle-track combination is used for coasting, accelerating and restarting of the vehicle. As the long stator is of the passive type, not requiring electric power, LSReIM operation can be cost effectively provided for coasting over relative long track parts, between adjacent stations. The long stator track may be arranged for supporting a vehicle comprising wheels, such as wheels running along train rails.

In accordance with another embodiment of the present disclosure, the track comprises rails and the vehicle comprises wheels for moving along the rails, such as regular or ordinary steel rails, for example, the further electric motor comprises a rotary electric motor on-board of the vehicle and electrically connected to the on-board electrical energy storage device, for rotating the wheels for moving the vehicle along the rails.

For coasting at high speed, i.e. merely operating as a speed-keeper, the rotary motor may be of a relative low power type, while the track and the wheels should be suitable for travelling of the vehicle at high speed. This contributes to reduce the costs of the drive system compared to an all active or powered track, for example, because regular rails will do as track instead of special tracks for interaction with the active part of the vehicle.

It will be appreciated that for a vehicle moving on wheels, both types of further electric motors, i.e. LSReIM and rotary motor may be provided, and designed such that a further motor alone or both motors in common, are operative for further accelerating the vehicle after launching by the LDFM, but also for bringing a vehicle to movement after standstill at part of the track not covered by LDFM operation. In such a case it will be appreciated that the vehicle needs not to be brought at a high or operating coasting speed, but that the drive power of the further motor needs to be sufficient just to move the vehicle to a next station or LDFM track part, for example.

In accordance with an embodiment of the present disclosure, for further improvement of the energy efficiency, in case of a rotary electric motor, the motor is arranged for being switched off during operation of the LDFM.

While the LDFM is operating, the vehicle is accelerated by the LDFM, such that the rotary electric motor may be switched off, hence not providing an electric load to the LDFM. The operation of the rotary electric motor may only start when the vehicle has reached or is near full coasting speed, which helps to further improve the drive system energy efficiency.

As an example, the rotary electric motor may be an induction motor. The advantage of using an induction motor as a speed-keeper is that electric losses are close to zero when the stator of the induction motor is switched off during the operation of the LDFM.

Alternatively, while the LDFM is operative, the rotary motor may be switched into operation supplementing the operation of the LDFM.

In accordance with another embodiment of the present disclosure, the vehicle and a third part of the track between the first and second station are arranged operating at least one of a Linear Synchronous Motor, LSM, and a Linear Induction Motor, LIM, the LSM arranged for further acceleration of the vehicle, wherein different type track parts comprising the third part of the track are separated over a distance.

When using different track part types, the separation between such different track type parts preferably has a length of at least one driven part of the vehicle, which helps to avoid unwanted transients in the produced thrust. Those skilled in the art will appreciate that the third and second part of the track may coincide when operating a rotary electric motor and an LSM and/or LIM.

It will be appreciated that an on-board coil of the vehicle may be arranged for interacting with other type of tracks, to form other linear motors suitable for driving the vehicle. For example, LSM operation allows thrust to speed-up and slow down. The LSM may be operated under constant power, which makes the lowest required battery- and converter-weight possible. The speed induced voltage may also be kept reasonably constant, as the track may be designed to have a fixed speed-position profile. LIM operation is advantageous when running along a simple track design is required, i.e. a simple long stator.

Following the present disclosure, the on-board electrical energy storage device may be arranged for being charged by at least one of an electric charging device at the first and second station, during launching of the vehicle operating the LDFM, and by regenerative power generated on-board of the vehicle operating the LDFM for braking movement of said vehicle.

In general, contactless charging of the on-board electrical energy storage device is possible when the product of thrust and relative speed of the vehicle is negative, which may occur with any of the above-mentioned linear motor types, also during deceleration of the vehicle during LSM and LIM operation, for example. In accordance with an embodiment of the present disclosure, the system is arranged for moving the vehicle along the track in a tube or tunnel with reduced air-pressure.

High velocity is made possible in a tube or tunnel where air resistance is reduced or eliminated (near vacuum). With the air friction nearly vanished, the drive system has only to overcome the remaining rolling or hovering resistance, which allows for optimized energy efficiency at high travelling speed, such as up to 1000 km/h or even faster. It will be appreciated that at a station measures are taken for boarding an de-boarding passengers and/or goods with minimal air-leakage to the tube.

A second aspect of the present disclosure provides a method of operating a multi-mode drive system comprising a vehicle and a track, the track running from a first station to a second station remote from the first station, the first and second station arranged for at least one of boarding and de-boarding of the vehicle, the vehicle comprising an on-board rechargeable electrical energy storage device, wherein the vehicle and a first part of the track at the first and second station are arranged operating an electric Linear Doubly Fed Motor, LDFM, and wherein the vehicle and a second part of the track between the first and second station are arranged operating a further electric motor different from an LDFM, the method comprising:

operating the LDFM for launching the vehicle for moving along the track and charging the on-board energy storage device of the vehicle, and operating the further electric motor for at least one of accelerating, coasting and for restarting movement of the vehicle for moving along the track after launching.

The above disclosed method of operating the multi-mode drive system enables exchange of electrical power between a stator on the track, a stator or mover on the vehicle, and the on-board electrical energy storage device of the vehicle. It allows the energy-storage of the vehicle to be charged during being parked in a station, launching and before synchronous operation during acceleration. The on-board (re)chargeable electrical energy storage device is effectively used to provide the energy needed for the further electric motor for coasting or other driving operations of the vehicle, such as further acceleration after launching and restart of the vehicle. The two operation steps, i.e. a first and second mode of operation, allow the vehicle to be driven in a cost and energy efficient manner.

In accordance with an embodiment of the present disclosure, wherein for operating the LDFM, the vehicle comprises an on-board electric coil and converter assembly, and the first part of the track comprises a stationary electric coil and converter assembly extending along a length of the first part of the track, the assemblies arranged comprising the LDFM, the method further comprises operating the stationary electric coil and converter assembly at a constant frequency and operating the on-board electric coil and converter assembly for generating coil currents in a field oriented fashion.

Field-oriented control, realised by adjusting output currents from the on-board vehicle converter, allows thrust control or speed control on different kinds of track types. Operating the stationary coils at a constant frequency is very advantageous in terms of reduced electrical an operational requirements to be set at the converter assemblies controlling the long stator of the LDFM, i.e. there is no requirement for overdimensioning, for example. Further, the operating frequency may be selected at a level not requiring very fast switches, i.e. switching semiconductor devices in the converter assemblies.

In accordance with an embodiment of the present disclosure, during at least one of accelerating and decelerating of the movement of the vehicle, the on-board rechargeable electrical energy storage is predominantly operated at constant electrical power.

A third aspect of the present disclosure provides a vehicle arranged for operating in the above disclosed multi-mode drive system.

In accordance with an embodiment of the present disclosure, the vehicle comprises an on-board coil and converter assembly arranged for operating at least one LDFM, and at least one of an electrical Linear Synchronous Reluctance Motor, LSReIM, a Linear Synchronous Motor, LSM, and a Linear Induction Motor, LIM.

A fourth aspect of the present disclosure provides a track arranged for operating in the above disclosed multi-mode drive system.

In accordance with the present disclosure, the track may comprise a plurality of track type parts arranged for operating at least one LDFM, and at least one of an LSReIM, an LSM, and a LIM, wherein different track type parts are separated over a distance.

The multi-mode drive system according to the present disclosure may comprise a plurality of tracks, a plurality of first and second stations, and a plurality of vehicles, arranged for simultaneously driving a plurality of vehicles along a track.

These and other aspects of the disclosure will be apparent from and elucidated with reference to the embodiment(s) described hereinafter and elucidated with the attached drawings.

DETAILED DESCRIPTION

The present disclosure is described in more detail below with reference to exemplary drive systems.

Figure 1:
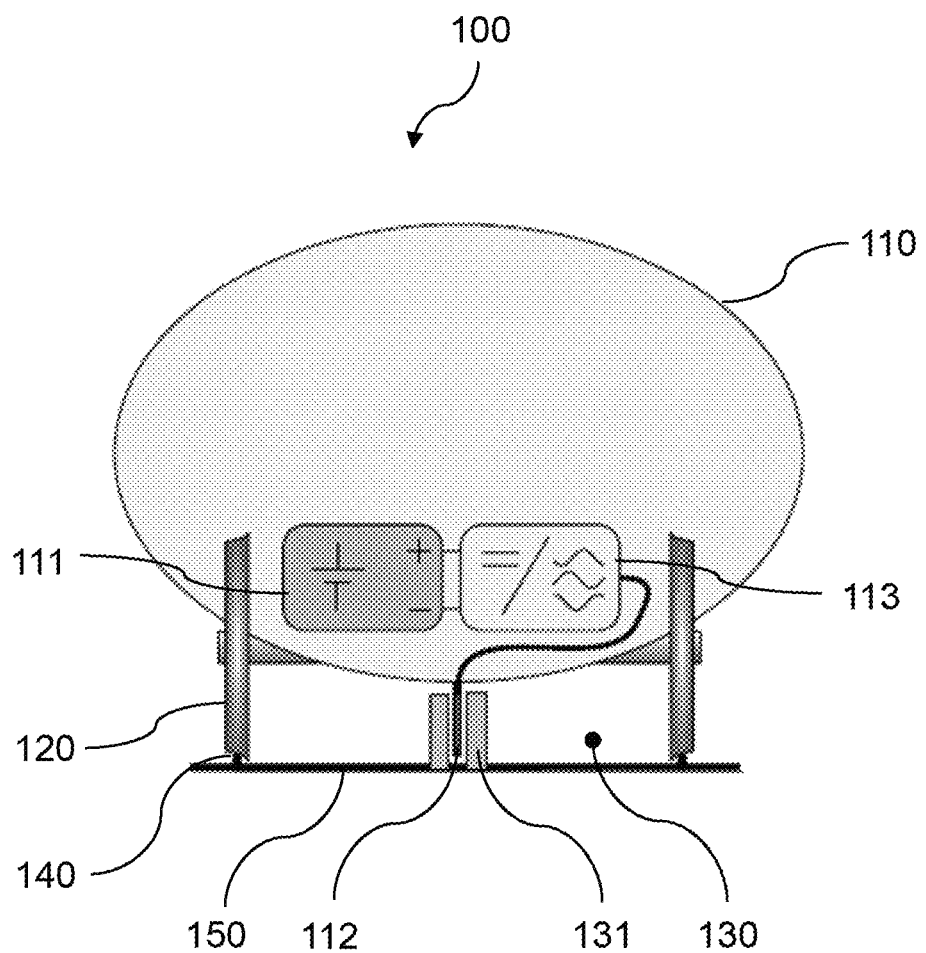
FIG. 1 illustrates, schematically, in cross-sectional view, a generalized example of an electric transport system comprising a drive system for driving a vehicle.

FIG. 1 illustrates, schematically, in a cross-sectional view, a generalized example of a transport system 100 comprising a drive system for driving a vehicle 110. In this example, the vehicle 110 is supported by wheels 120 running on and guided by a pair of rails 140 arranged on the ground 150. It is noted that the wheels are not required and that the vehicle may be moved in a levitated position only along the track.

The vehicle 110, also called a pod, a shuttle or a capsule, comprises an on-board (re)chargeable electrical energy storage device 111, an on-board electric coil 112 and a power converter 113. The on-board coil 112 and the power converter 113 are coupled with each other to form an on-board electric coil and converter assembly. In practice, the on-board electric coil 112 is moveably arranged and magnetically coupled with respect to a long stator 131 of track 130 and arranged and operative as a short stator to induce a magnetic flux therein. The track 130 is assumed to extend transverse to the plane of the drawing sheet.

The terms 'short stator' and 'long stator' are well known to the persons skilled in the art, and used as such. The term 'short' refers to the fact that the length of the vehicle 110 carrying the short stator (i.e. the on-board coil 112) is relatively short with respect to the long stator 131 of the track 130 that may extend over a distance along the length of the rails 140, considerably longer than the length of the vehicle 110. As the on-board coil 112 of the vehicle 110 is able to move relative to the rails 140, it is also indicated as 'a moving coil' or a mover.

The on-board rechargeable electrical energy storage device 111 may be a battery, a super capacitor, a super conducting coil, a flywheel or the like, as well as combinations thereof. The on-board energy storage device 111 is arranged for powering the on-board electric coil 112 and converter 113 assembly and, in accordance with an embodiment of the present disclosure, arranged for being charged and for supplying stored energy for driving the vehicle 110 during operation, in particular at coasting speed after launch of the vehicle 110.

In an embodiment, the on-board coil 112 is arranged over a length of the vehicle 110 and operates with at least a two-phase Alternating Current, AC, powering, or with a standard three-phase AC power supply. The power converter 113, for example, may be arranged as a bi-directional Direct Current, DC to AC converter (four quadrants) connected to the on-board energy storage device 111 and arranged for generating alternating currents in the on-board electric coil 112.

The long stator 131 of track 130 may be of an active or passive type. The vehicle 110 and the long stator 131 of track 130 interact with each other to form the drive system for driving the vehicle 110 along the track 130, which will be described in more detail in the following.

The drive system is a crucial part for the operation of the transport system 100, in particular for operation at high speed or very high speed above the speed of classic prior art electric trains powered from overhead lines, for example. In accordance with an embodiment of the present disclosure, the drive system for moving the vehicle 110 along the rails 140 is realised by driving the vehicle 110 operating different motor types. That is, the multi-mode drive system is arranged to operate under different driving or operational modes, at a track between a first station and a second station, remote from the first station along the track for boarding and de-boarding the vehicle, comprising launching, i.e. bringing the vehicle into motion from standstill, accelerating, coasting, regenerative braking of the vehicle as well as power exchange with an active part of the track.

FIGS. 2a, 2b, 3a to 3c illustrate, in cross-sectional views, examples of different track types in accordance with the present disclosure. The different track types interact in different ways with the moveable on-board coil 112 of the vehicle 110 (only part of which is shown in the figures) to form different types of linear motors, thereby realising control of mechanical thrust of the drive system by adjusting output from the power converter 113 on-board of the vehicle 110 in a field-oriented fashion. The different track-types can be used at specific parts of a track 130. Structural configurations and field distributions along length directions of different linear motor types formed by the vehicle-track combination are illustrated in FIG. 4.

Figure 2A:
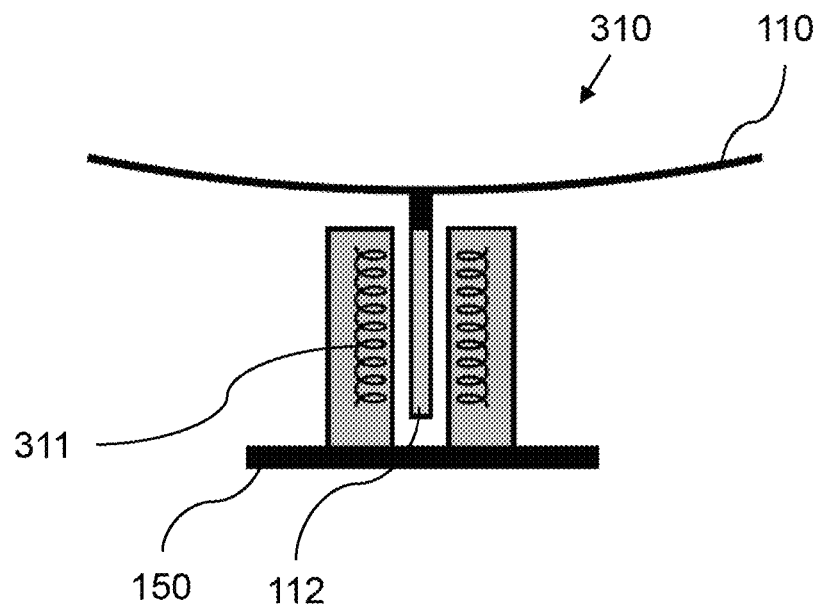
FIGS. 2a, 2b illustrate, in cross-sectional views, examples of different vehicle-track types in accordance with the present disclosure.

A first track type 310 illustrated in FIG. 2a is an active track composed of stationary electric coils 311 extending over a distance along the track and may be energized at a fixed or variable electrical frequency power. The stationary electric coils 311 together with a converter for powering the same (not shown) form a stationary coil and converter assembly. The stationary coils (active long stators) 311 are designed to magnetically couple with the on-board electric coil 112 of the vehicle 110. The stationary electric coils 311 act, in fact, as a primary winding of a transformer with a secondary winding being the on-board coil 112. The vehicle-track combination operates as a Linear Doubly Fed Motor, LDFM, or in fact as a transformer with a movable secondary winding.

In accordance with the present disclosure, this first track type 310 is located at a first part of a track in and around stations for boarding and de-boarding a vehicle and the LDFM formed by the vehicle and this first part of the track, i.e. forming a vehicle-track combination, is arranged for launching the vehicle 110 and for fast contactless charging of the on-board energy storage device 111 of the vehicle 110. It is possible to combine the charging of the on-board energy storage device 111 with acceleration/deceleration of the vehicle 110, which will be detailed in the following.

Mechanical power delivered to the vehicle 110 equals powers from both the on-board coil 112 and the stationary coils 311. According to an analysis, at standstill of the vehicle 110, a force is exerted by a mechanical brake to the track 130, and maximum power may be harvested to charge the on-board energy storage device 111. Before synchronous operation, i.e. when a velocity or speed of the vehicle 110 equals a wave velocity generated in the stationary coils 311, the electric power delivered by the on-board coil 112 to the vehicle is negative, which means that it is possible to charge the on-board energy storage device 111. Charging may continue up to a speed of the vehicle 110 at which synchronous operation occurs, i.e. when the electrical frequency at the moving coil becomes zero. This speed depends on pole-pitch and the electric frequency of the powering of the stationary coils 311. Charging the on-board energy storage device comprising batteries, for example, can be done in about 5 minutes of time, which is long enough to store sufficient energy on board of the vehicle 110 to perform the acceleration and the coasting of the vehicle over a long distance.

The active doubly fed track section is the most expensive part of the drive system per unit length, but basically only needs to have a length extending along a train station, such that only sub-synchronous operation may be used in practice. The minimal length of the active part of the track may be that of the longest expected train, i.e. one or a number of concatenated, mechanically coupled, vehicles.

Figure 2B:
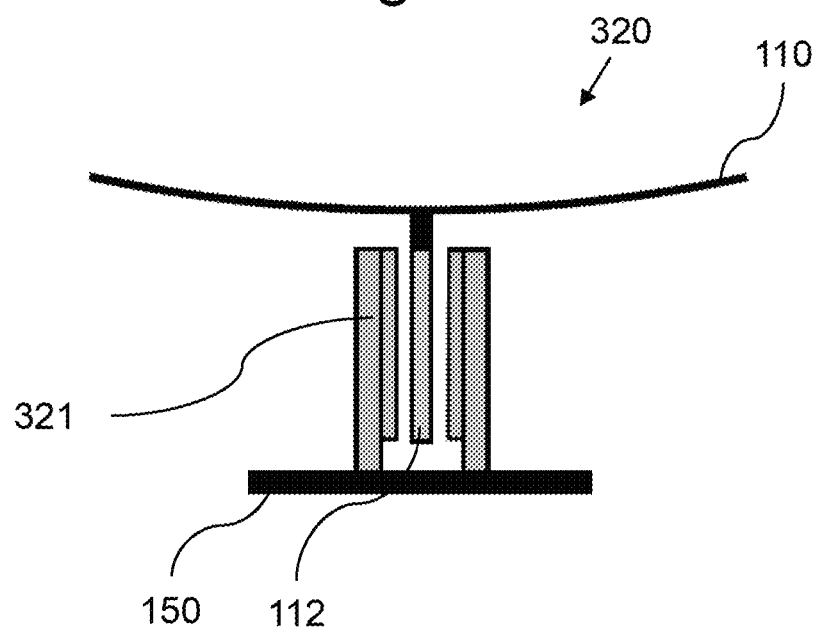

A second track type 320, as illustrated in FIG. 2b, comprises a passive track or long stator 321, for example composed of a structure of alternating segments, such as metal segments and/or segments of ferrite or iron-compound materials having different magnetic properties extending along a length of the track (this can be seen more clearly from FIG. 4). With this structure of the track 321, the on-board coil 112 sees position dependent inductance values from the track 321 while moving. The track 321 and the on-board coil 112 together operate as a Linear Synchronous Reluctance Motor, LSReIM. The LSReIM may be used to generate considerable thrust in case the vehicle 110 needs to restart from a position somewhere along the track where an LSReIM is present.

Further, this LSReIM track type 320 may be arranged following the first LDFM track type 310 in transport direction, i.e. downstream, at a second part of the track between a first and second station along the track, and may be used for further accelerating the vehicle 110. It may also be used for coasting when the rated speed is reached. Restarting the vehicle 110 at a place where no LDFM is provided, is also made possible by the second LSReIM track type 320. In this sense, the track type 320 may be used for driving the vehicle along the remaining part of the trip.

It will be appreciated that the on-board coil 112 will be loss-free when switched off. When wheels 120 are present, and as drag per lift on wheels is very low (0.001 to 0.004), less force is needed to keep the vehicle 110 rolling on the track once a rated speed is built up. In consideration of the above, regular train or tram rails may be used for guiding and supporting the wheels along the track.

Figure 3A:
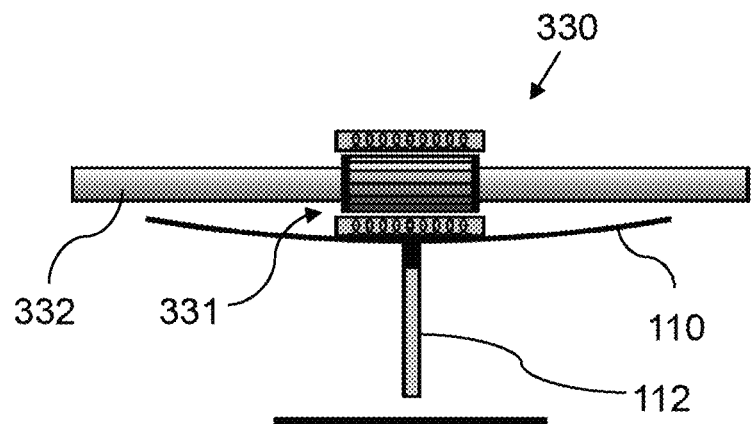
FIGS. 3a, 3b, 3c illustrate, in cross-sectional views, examples of further vehicle-track types in accordance with the present disclosure.
Figure 4:
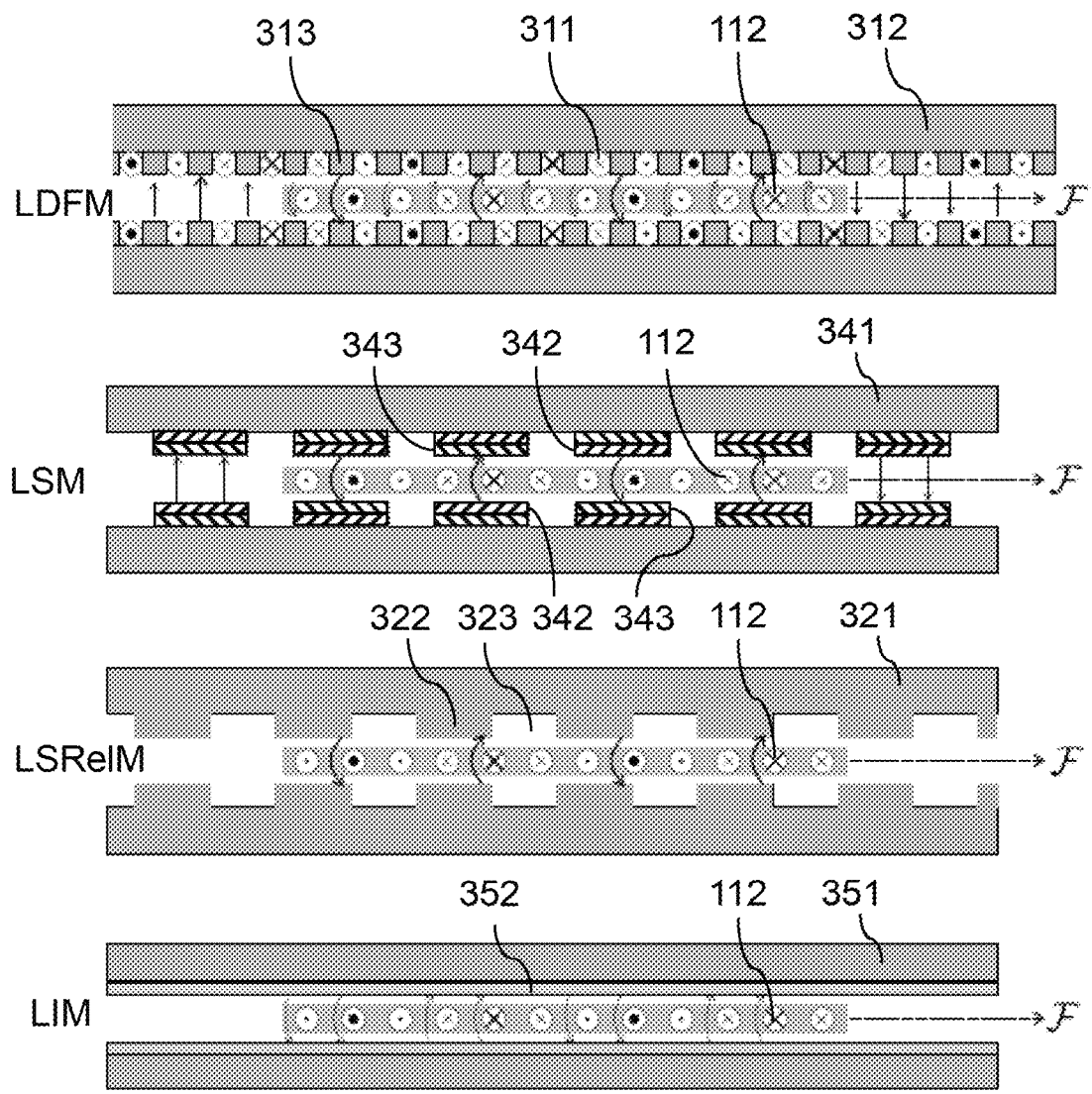
FIG. 4 illustrates, schematically, examples of structural configuration and field distributions along length directions of different linear motor types, in accordance with the present disclosure.

As illustrated in FIG. 3a, a further motor 330, such as a rotary electric motor, may be arranged on the vehicle 110, electrically connected to the on-board energy storage device 111 (not shown), providing the further motor. In an embodiment, the rotary electric motor may be a rotary electric motor 331 mounted on an axle 332 of the vehicle 110 and arranged for operating as a speed-keeper, such as a commercially available high speed 20 kW induction motor that weighs less about 60 kg, which will not add much weight to the vehicle 110. The further motor 330 may also comprise an electric rotary motor driving the axle 332 using an intermediate drive-line or transmission gearing.

The advantage of using an induction motor as speed-keeper is that losses are close to zero when the stator of the induction motor is switched off during the operation of the high thrust linear drive system, i.e. the LDFM. Means for braking safely may need to be added, either to the wheels 120 or use of a conducting fin as an eddy-current brake to dissipate the heat in the track and not in the vehicle 110.

An LSReIM drive and/or rotary induction motor driving wheels on regular rails may be used for the whole track, except for the stations where the vehicle 110 is to be charged, accelerated and decelerated, using an LDFM.

Figure 3B:
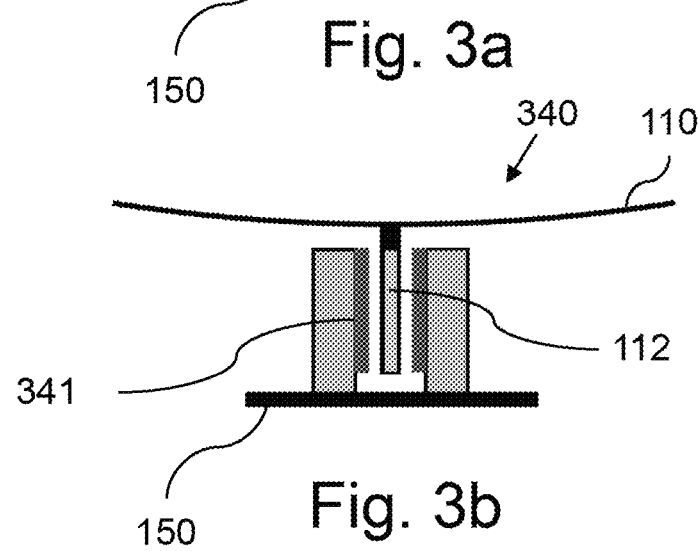

FIG. 3b illustrates, in a cross-sectional view, a third track type 340, which is a passive track composed of a long stator 341 comprising permanent magnets of opposite magnetic polarity (342, 343), alternately spaced in longitudinal direction of the track with a proper pole-pitch to make the combination of track and vehicle drive components work as a 'short-stator' type Linear Synchronous Motor, LSM. (This can be seen more clearly from FIG. 4). The on-board electric coil 112 on the vehicle 110 forms an active short stator. LSMs can operate at a high energy-efficiency.

The energy for further acceleration of the vehicle 110 needs to be provided by the on-board energy storage device 111 as the wave velocity of the long stator is now zero.

The achievable propulsion power in the vehicle 110 will be in the order of 50 to 500 W/kg. Once the required cruise speed (for example 1000 km/h, potentially much higher) has been build up, a drag/lift ratio of a levitation system will determine the necessary power to maintain this speed over the remaining distance of the track. The necessary length of the passive magnet, PM, track depends on the available specific power in W/kg. For example at 500 W/kg a length of about 16 km will be needed to achieve the coasting speed of 1000 km/h, for 200 W/kg a distance of 36 km is needed.

This LSM track type 340 may be arranged following the first LDFM track type 310 in transport direction, i.e. downstream, at a second part of the track between a first and second station along the track.

In an embodiment, a layout of the permanent magnets of the long stator 341 may be such that a smaller percentage of the available poles on the track are equipped with magnets at larger distance from the station. In this way, an LSM track section can be operated under constant power which implies the lowest required battery- and converter-weight, and the track may be designed to have a fixed speed-position profile, i.e. the induced voltage in the on-board or moving electric coil 112 can be kept reasonably constant. Lower speeds are always possible, while higher ones can be and should be avoided when approaching a station.

After leaving the LSM section, the vehicle 110 only needs to maintain its speed for the largest part of the journey. For an economic drive system, the coasting power should be around an order of magnitude smaller than the acceleration power, enabling a simpler and less expensive passive track type to be suitable for coasting.

Figure 3C:
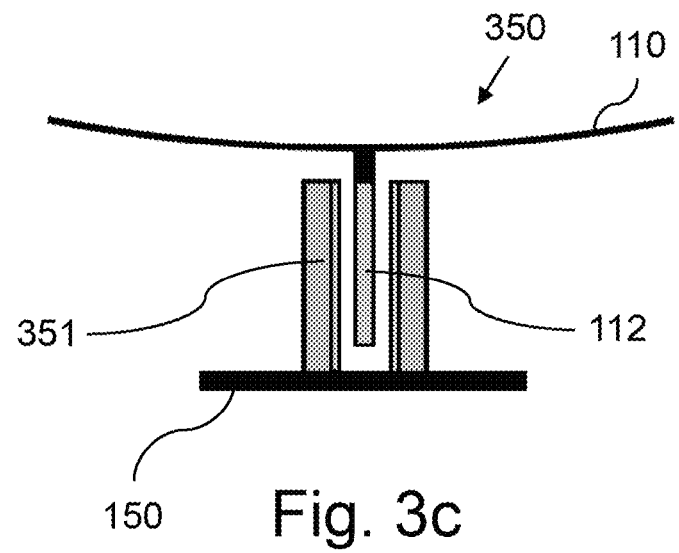

FIG. 3c illustrates, in a cross-sectional view, a fourth track type 350 comprising an inexpensive long stator 351 made of aluminium on solid back iron, for example. The long stator 351 together with the on-board electric coil 112 of the vehicle 110 forms a Linear Induction Motor, LIM. Although LIMs are of relatively low efficiency (high slip) and suffer from entry- and exit-effects at high speeds, a LIM may be used for constant-speed-coasting of the vehicle at a second part or third part of the track between a first and second station along the track, which may be the longest section of a track.

An advantage of the LIM operation is that adjusting of the speed remains possible, even energy regeneration during braking, although with a much lower efficiency than in an LSM, LSReIM, and LDFM mode of operation. A sensorless control method in the vehicle 110 will be able to select the stator currents such that thrust is continuously controllable;

both acceleration and deceleration are possible in LDFM, LSReIM, LSM and LIM drive operation.

FIG. 4 illustrates, schematically, examples of structural configurations and field distributions of tracks along length directions of linear motor types LDFM, LSM, LSReIM, and LIM, in accordance with the present disclosure. In the figure, current flow directions in the coils when in operation, are depicted by the usual cross (leaving the viewer, i.e. going into the paper) and dot (approaching the viewer, i.e. coming out of the paper). Direction arrows in the figure indicate the direction of magnetic flux lines.

In an embodiment according to FIG. 4, the LDFM may comprise an active long stator 312 with a back iron made of laminated steel and electric coils 311 arranged on stator teeth 313 protruding from the back iron stator 312. The LSM may comprise a long stator 341 with a back iron made of solid steel and permanent magnets 342 and 343. The permanent magnets 342, 343 are of opposite magnetic polarity, indicated by hatchings in different directions, respectively. Such as north poles 342 and south poles 341, for example. The LSReIM may comprise a long stator 321 with a back iron made of solid steel, which is configured as having thick segments 322 and thin segments 323. The LIM may be built from a solid aluminium plate 352 on a long stator 351 having a solid back iron, for example.

Described above is a multi-mode driving system formed by the vehicle 110 with the on-board (re)chargeable energy storage device 111 and the on-board electric coil 112 capable of operating with different types of tracks 310, and one or more of tracks 320, 340 and 350, in accordance with the present disclosure. The present multi-mode drive system provides the possibility to combine advantages of the mentioned track-types using the same vehicle. With the drive system in accordance with the present disclosure, the operation of the vehicle when traveling over the track, including launching, further acceleration, coasting, braking and charging of the on-board energy storage device, can be realised in a cost and energy effective fashion.

Figure 5:
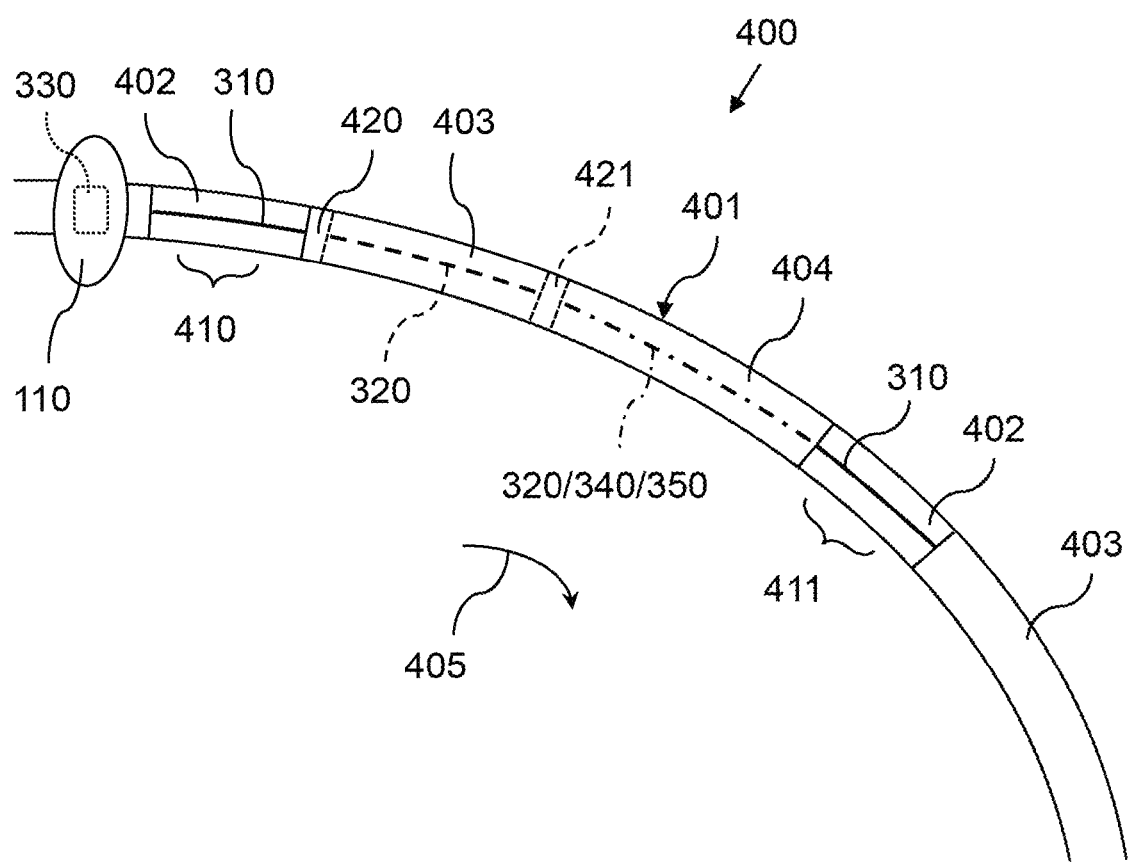
FIG. 5 illustrates, schematically, an example of a layout of track types in accordance with the present disclosure.

FIG. 5 illustrates, schematically, an example of a layout 400 of different track types along a track or railroad 401, in accordance with the present disclosure, in which long stators forming different types of linear motors are schematically shown, and an arrow 405 is used to indicate a travel direction of a vehicle 110 along the track 401 between a first station 410 and a second station 411, remote from the first station 410. For convenience sake, the first and second stations 410, 411 arranged for boarding and de-boarding of the vehicle 110 are indicated by curly brackets.

In an embodiment, an active LDFM track 310 is provided and installed at a first part 402 of the track 401 at the first station 410, and at the second station 411. In this example, the LDFM 310 is followed by an LSReIM track 320, indicated by a dashed line, operating as a further electric motor at a second part 403 of the track 401, between the first 410 and second station 411, which may be used for further accelerating and/or coasting of the vehicle 110, after being set into motion by an LDFM 310. Alternatively, an LSM track 340 and an LIM track 350 may be used, indicated by a dash-dot line, at the second part 403 and/or a third part 404 of the track 401 between the first and second stations 410, 411, instead of and/or in addition to the LSReIM 320 for coasting purposes, for example. Separations 420, 421, shown for illustrative purposes, may be arranged between transition points between different track types, i.e. motor types. It is noted that the second part 403 of the track 401 may extend over the whole distance from the first station 410 to the second station 411.

As energy needed to overcome the drag along an ordinary trip exceeds the kinetic energy at top speed, it is economic to only use the track type 310 forming the LDFM around the stations 410, 411, to charge the on-board electric energy storage 111 of the vehicle 110 and move same out of a station.

Cost per unit length for an active track is much higher than a passive track, hence the present disclosure suggests a passive track for the largest part of a track. The LSReIM track 320 only needs to overcome a small drag and may be designed such that it could provide a reasonable amount of the peak thrust, allowing this type of inexpensive track to be used for the majority of the track-length.

In case the vehicle has wheels 120, it would be very beneficial to install the further electric motor as an on-board rotary electric motor 330, indicated by dotted lines, in the vehicle 110, for example in a direct-drive fashion to drive an axle 332 of a wheel pair 120. This allows the use of rails 140, such as regular train rails, along the entire track 401 or part of the track 400 extending between the stations 410, 411 without a long stator track supporting a linear motor drive system to be used at a majority of the track-length.

The track type 340 forming the high efficiency LSM may be used for further accelerating of the vehicle. Therefore, this track type may also be located outside the stations 410, 411 in moving direction 405, even just after the LDFM track part 310. The LSM track 340 may be used for coasting as well.

The relatively low efficiency LIM track 350 suffices for constant-speed coasting as well, and may also be used for a large part of the track-length between the stations 410, 411.

With regard to the excitation of the stationary coils, it will be appreciated that the stationary coils 311 forming the LDFM stators may be excited in different ways: a single frequency, a variable frequency and/or variable voltage, a zero frequency (LSM-like) or a short circuit (LIM-like). The feeding frequency of the LDFM stators may be chosen based on lamination quality and favourable airgap flux of the long stator.

Those skilled in the art will appreciate that different types of further electric motors, not operating an LDFM, may be used together at the second and third part of the track. In case contactless charging of the on-board electric storage device of the vehicle along the track 401 between stations 410, 411 is required, sections of the second 403 and/or third part 404 of the track 401 may be arranged for operating an LDFM. The length of these sections depends on the amount of charging required.

It is beneficial to use short sections of stators, driven by the same voltage and frequency to minimize unwanted series inductance between adjacent sections of stators. By generating a 'vehicle-present' signal, different sections of the stators may be switched on or off to minimize losses without a vehicle present.

The stator sections are preferably connected or powered to get the best magnetic coupling with a parked and/or moving vehicle.

The stator coils may be controlled such that a fixed AC flux level is provided to the on-board coil 112 of the vehicle. In an embodiment, the stationary electric coils 311 are fed in parallel with a source of voltage, either by actually connecting them in parallel, or by feeding each coil-set by a separate converter. The magnetic coupling is maximized, i.e. leakage inductance is minimized, in this way, thereby maximizing the available system's peak power.

Figure 6A:
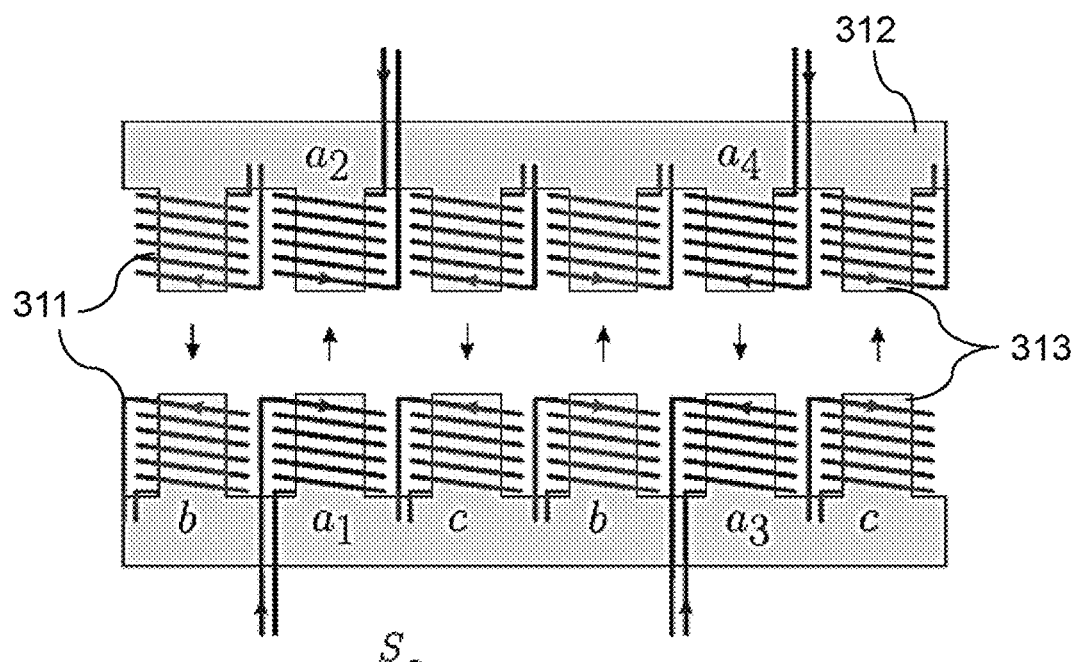
FIG. 6a, 6b, 6c illustrate, schematically, examples of stationary coils and excitation thereof in accordance with the present disclosure.
Figure 6B:
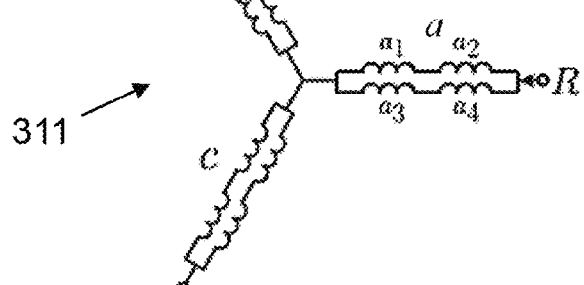
Figure 6C:
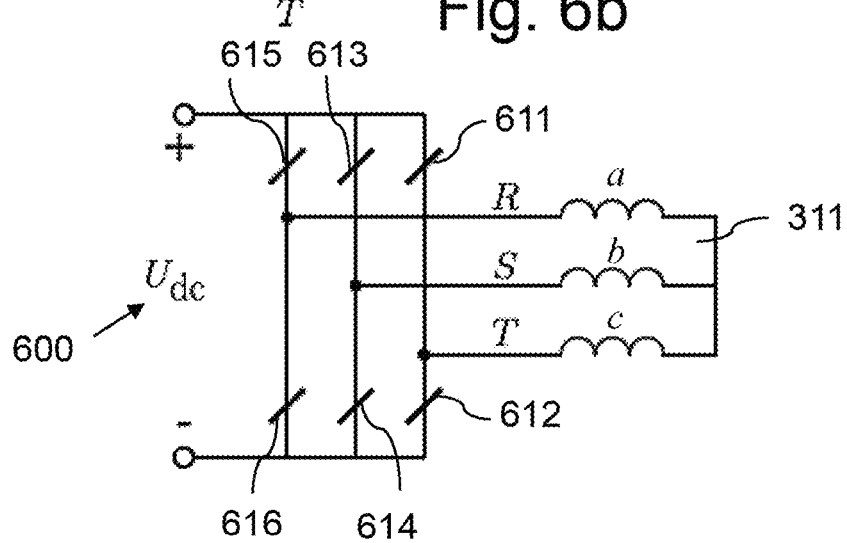

FIGS. 6a, 6b, 6c illustrate, schematically, examples of stationary electric coils and excitation thereof, in accordance with the present disclosure.

FIG. 6b shows a circuit diagram of three-phase stationary electric coils 311, each phase R, S, T comprises two parallel connected branches a, b, c, each comprising two series connected coil parts, for example a1, a2 and a3, a4, as illustrated in FIG. 6a.

FIG. 6a shows part of stationary electric coils 311 arranged at the stator teeth 313, in particular for the coil parts a1 to a4, forming one pole pair a1, a2 and a3, a4 respectively. In operation, the coils are powered to provide a mutually alternating magnetic flux between opposite teeth 313. Arrows shown at the windings parts indicate the positive direction of current flow.

FIG. 6c illustrates, schematically, stationary electric coils 311 connected to a six-pulse constant frequency square-wave switching converter 600, comprising semiconductor operated switches 611 to 616, yielding soft-switching with minimal losses.

Figure 7:
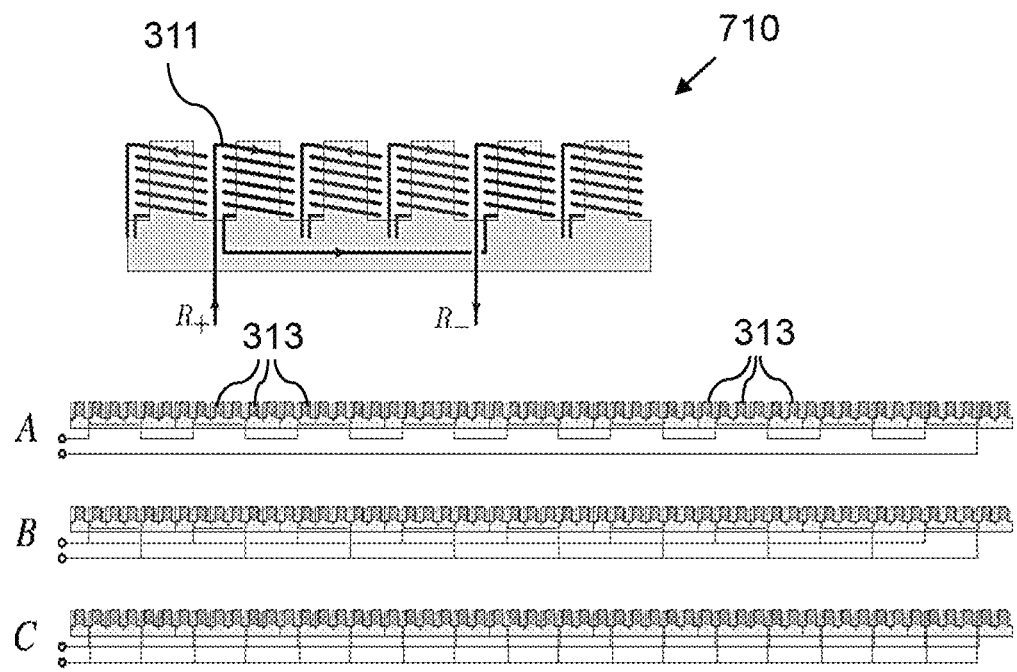
FIG. 7 illustrates, schematically, further examples of exciting stationary coils in accordance with the present disclosure.

FIG. 7 illustrates, schematically, further examples of exciting stationary electric coils 311 in accordance with the present disclosure. In FIG. 7, a one pole-pair stator 710 is shown. Only phase R is drawn for simplicity's sake. Option A shows series connecting the coils 311. Option B shows parallel connection of sets of two coils 311. Option C shows parallel connection of all coils 311. Option C provides for minimizing leakage inductance to the vehicle's electric coil 112. In option C, each tooth 313 acts as a source of flux, independent of neighbouring pole-pairs.

Figures 8A, 8B, 8C:
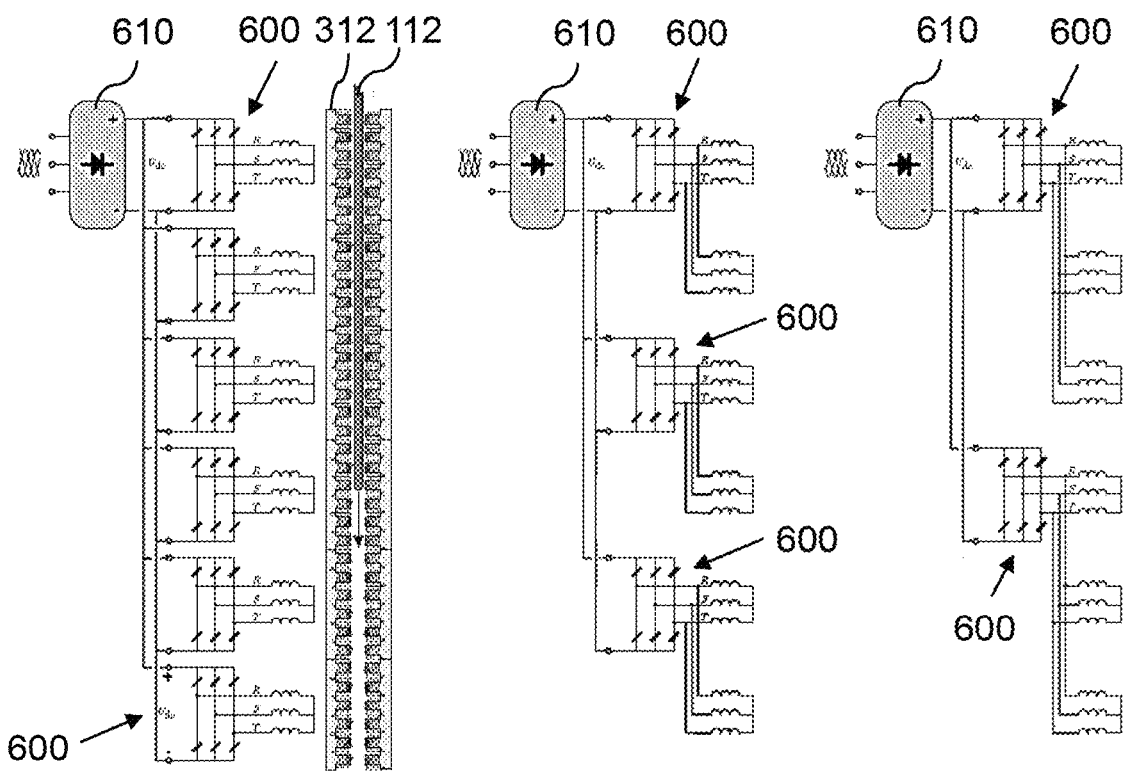
FIGS. 8a, 8b, 8c show embodiments of stator arrangements in accordance with the present disclosure.

FIGS. 8a, 8b, 8c show embodiments of stator arrangements in accordance with the present disclosure. FIG. 8a shows a stator arrangement wherein all pole-pairs are provided with an individual converter 600, commonly powered by a single power supply 610. FIG. 8b shows a stator arrangement comprising two pole-pairs per converter 600. FIG. 8c shows a stator arrangement having three pole-pairs per converter 600. In a similar way any number of pole-pairs can be connected to a single converter. Per pole-pair (around 0.2 m length) the rating is around 5-20 kVA.

For powering the LDFM, where the moving part has an on-board energy buffer and a power-electronic converter that supplies AC currents to the on-board coils which are magnetically coupled to on-shore coils (stators) that are fed by on-shore AC power converters or directly connected to a 3-phase grid, it is proposed to feed the long stators in small sections, parallel with a constant frequency and controlling mechanical thrust (motoring or regenerating) by adjusting the on-board converters output currents in a field-oriented fashion. This control enables power-exchange between the stator, the mover and the on-board energy storage device.

Figure 9A:
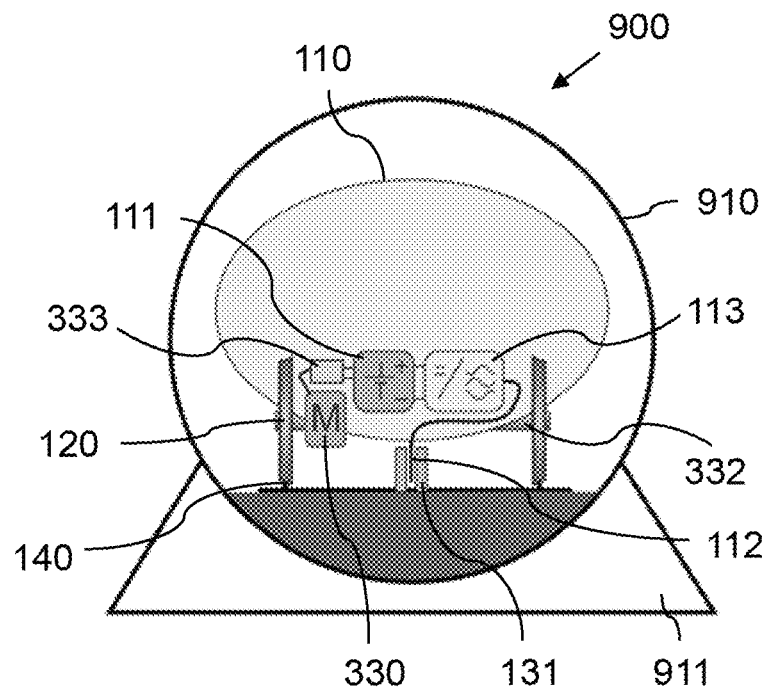
FIGS. 9a, 9b and 9c illustrate, in schematic views, operation of the drive system in accordance with the present disclosure, arranged as high speed tube transport systems.
Figure 9B:
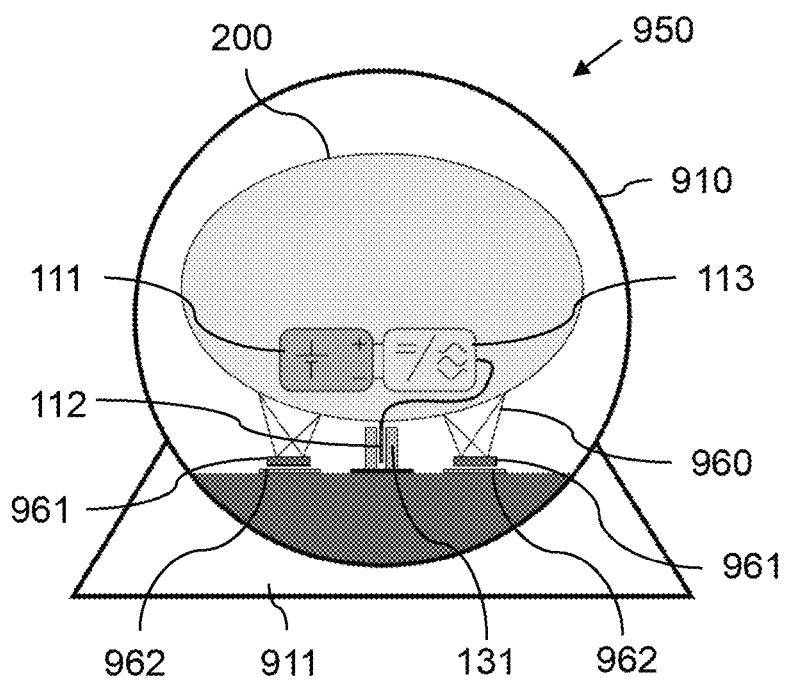

FIGS. 9a and 9b illustrate, in schematic views, operation of the multi-mode drive system in accordance with the present disclosure, arranged as high speed tube transport systems.

FIG. 9a shows a multi-mode drive system 900 arranged for vehicle transport on wheels 120 along rails 140 in a tube or tunnel 910 supported by a pedestal construction 911. The vehicle 110 comprises an on-board (re)chargeable electrical energy storage device 111, an electric coil 112 electrically connected to a controllable DC/AC power converter 113, and a rotary electric motor 330, such as an induction motor M, electrically connected to a controllable DC/AC power converter 333. The power converters 113 and 333 electrically connect to the on-board electrical energy storage device 111. The on-board electric motor 330, in use, drives an axle 332 of the vehicle 110 and hence rotate the wheels 120 that are mechanically connected to this axle 332. The on-board electric coil 112 is moveably arranged and magnetically coupled with respect to a long stator of a track arranged, among others, to operate an LDFM.

FIG. 9b illustrates a multi-mode drive system 950 using so-called electrodynamic suspension, EDS, levitation, for which the vehicle 200 comprises a support structure 960 bearing permanent magnets 961 opposite an aluminium plate part 962, for example, mounted at the tube-floor, for transport of the vehicle 200 by levitation. The on-board energy storage device 111, the power converter 113, and the on-board electric coil 112 of the vehicles 110 and 200 are identical for both systems 900, 950. The electric coil and converter assembly of the vehicle 200 is arranged for operating different linear motor types along the track, as described above, including an LDFM.

Figure 9C:
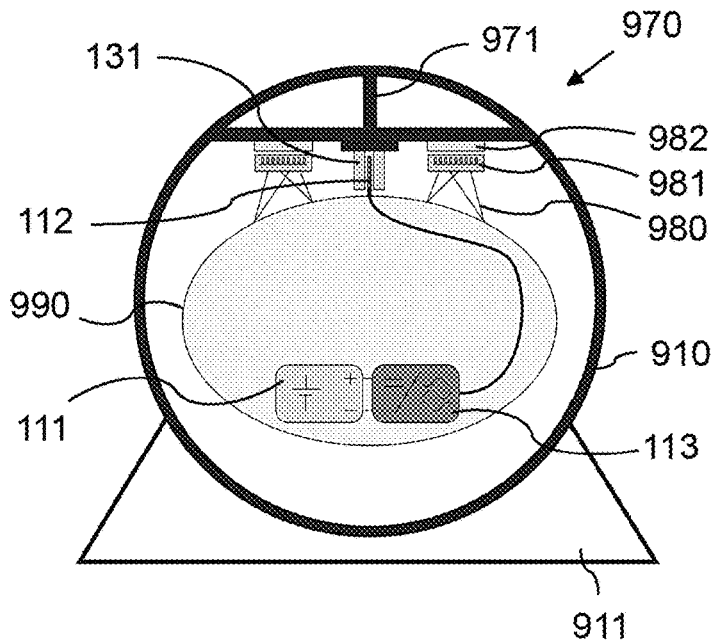

FIG. 9c illustrates a multi-mode drive system 970 using so-called electromagnetic suspension, EMS, levitation, for which the vehicle 990 comprises a support structure 980 bearing permanent magnets 981 opposite an aluminium plate part 982, for example, mounted at a support structure 971 arranged at the tube-ceiling. The on-board energy storage device 111, the power converter 113, and the on-board electric coil 112 of the vehicles 110 and 990 are identical for both systems 900, 970. The electric coil and converter assembly of the vehicle 990 is arranged for operating different linear motor types along the track, as described above, including an LDFM. Although not shown, those skilled in the art will appreciate that in a practical EMS system, safety means (not shown) are provided for avoiding sideways movement of the vehicle 990 to engage the tube wall and to drop from the support structure 971.

The multi-mode drive systems 900, 950 and 970 may also operate externally from, i.e. outside the tube or tunnel 910.

High velocities in a tube can only be realized economically when the air resistance is reduced or eliminated (i.e. the tube is near vacuum). Once the air friction is nearly gone, the rolling or hovering resistance becomes the second point to optimize. Wheels 120 running on rails 140 are possible, but need be large in diameter at excessive speeds of many hundreds of meters per second. Train record speeds of about 575 km/h were reached on wheels and a jet-propelled car has travelled at 1227 km/h, so wheels can do the job in practise. Obtaining an acceptable drag/lift ratio with EDS, however, remains challenging.

Figure 10:
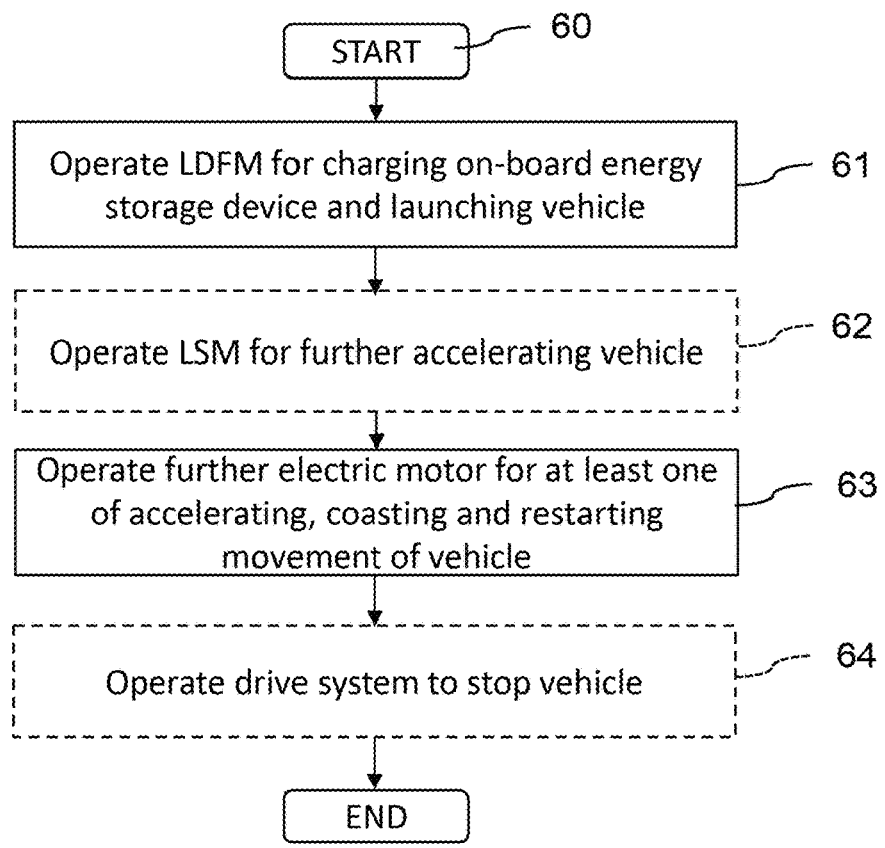
FIG. 10 illustrates, in a flow chart-type diagram, an example of a method of operating the multi-mode drive system in accordance with the present disclosure.

FIG. 10 illustrates, in a flow chart-type diagram, an example of a method 60 of operating the present multi-mode drive system for driving at least one vehicle along a track. In accordance with the present disclosure, and referring to FIGS. 1 to 4, at a station 410, 411 where the vehicle 110 is to be launched, the LDFM 310 formed by the vehicle-track combination is, at step 61, operated for charging the on-board energy storage device 111 of the vehicle 110, if required, and for launching the vehicle 110.

With the LDFM, a velocity of the vehicle is equal to a difference between wave velocities of the on-board coil and the stationary coils. The wave velocity of the on-board vehicle is negative, allowing charging of the on-board energy storage while accelerating the vehicle. When the wave velocity of the on-board coil of the vehicle becomes zero, synchronous operation is realised.

Before synchronous operation, i.e. at sub-synchronous operation, a power delivered by the on-board coil 112 to the electrical energy storage device 111 of the vehicle is negative, therefore the LDFM is able to charge the on-board energy storage device 111 during standstill and during acceleration as long as sub-synchronous operation is maintained. During deceleration of the vehicle contactless charging of the on-board energy storage device 111 is possible during so-called over-synchronous operation.

Optionally, when the vehicle 110 leaves the first track part 402 at a station 410, 411 operating together with the on-board coil 112 as the LDFM, at step 62, an LSM may be operated at part of the track 400 directly following the first track part 402, and prior the second part 403 seen in moving direction 405 of the vehicle 110, to further accelerate the vehicle 110. The LSM configuration is able to accelerate and decelerate with almost same efficiency to the on-board power (when neglecting mechanical losses). Hence, operation of the vehicle using an LSM or LSReIM replacing the LDFM at one or more stations 410, 411 is conceivable, combined with charging means for charging the on-board electric storage device at a station using electrical contact devices such as electric cable connectors and/or electric pantograph type devices used with electric trains, trams or busses, for example, Contactless charging based on resonant magnetic induction to transfer energy between an electric coned pad along part of the track, i.e. at the ground or the ceiling of a tunnel, and another electric coiled pad under the floor or at the ceiling of the vehicle, for example. In an embodiment of the present disclosure, an LSM section with decreasing number of magnets at a part of the track 400 at a greater distance from the station may be economical.

Next, at step 63, a further electric motor is operated at the second part 403 of the track between the stations 410, 411, for at least one of accelerating, coasting and for restarting movement of the vehicle after launching.

The further electric motor may be an LSReIM or a rotary electric motor, for example. Acceleration from one or both of the previous steps 61, 62 has brought the vehicle 110 to a high speed. Therefore, operation at this step 63 is essentially coasting of the vehicle 110 along the track, requiring energy mainly for overcoming the drag.

In case further acceleration is required, both the LSReIM formed by the on-board coil 112 and the track part with the track part of alternating segments having different magnetic properties, such as metal segments and/or segments of ferrite or iron-compound materials, and a further on-board rotary electric motor 330 may be used for acceleration. Restarting from standstill outside a station is also made possible with either the LSReIM and/or the on-board electric rotary motor.

Optionally, at step 64 the drive system is operated to bring the vehicle to a stop while breaking energy can be regenerated for charging the on-board energy storage device 111 of the vehicle 110, 200.

In launching a vehicle using the multi-mode drive system in accordance with the present disclosure, constant acceleration may be considered.

As the on-board energy storage device 111 may be limited in its output power, according to an embodiment of the present disclosure, it is advantageous to design a predominantly 'constant-power launch' as this utilizes the system components more efficiently. Specific power levels of only 100 W/kg, which is a regular value used in present electric vehicles for road transport, are sufficient for fast and efficient long distance tube-transport, for example.

When assuming a constant-power launch, coupled flux from permanent magnets may be diluted along the track to achieve progressive field-weakening and hence constant voltage and constant current operation throughout most of the acceleration stretch. Calculation shows that the total amount of flux (number of magnets along the track) is proportional to a square of a final speed. Although a lower specific power causes a longer time and distance before the target speed is reached, the total amount of necessary magnet material however is comparable; it means thinner magnets over a longer stretch, assuming the same current-density in the vehicle coils.

In the following, various aspects of system design of the above drive system will be discussed. It is noted that the terms "pod", 'capsule' and 'vehicle', as well as 'shore' and 'track' are used interchangeably.

Active Track Around the Stations

The track section around stations is of type LDFM and contains an active track composed of stationary coils (stators) which are designed to magnetically couple with the on-board vehicle-coils. The active stators act as the primary of a transformer with the secondary being the pod's coil. The combination works as a doubly fed machine or a transformer with movable secondary winding. The electric frequency on the track-coils (for example 400 Hz) represents a certain wave-velocity $v_{shorecoil}$, for example 80 m/s in launch direction when a realistic pole-pitch of 0.1 m is assumed.

A major advantage, both for complexity and cost, is that the track-frequency does not need to be variable. A fixed frequency allows six-step modulation with soft-switching which is cost-effective and has low losses. Power electronics of the station hardware is in this case less expensive and controls are hardly needed. The stator sections are connected or fed in parallel, to get the best magnetic coupling with the parked or moving pod or pods.

In a doubly fed machine, the pod's velocity equals the difference between wave velocities in the two coils. Assume the pod's speed $v_m$ positive when going forward and the wave speed of the pod-coil $v_{podcoil}$ positive when traveling in a passive track section. Also the wave speed in the active stator $v_{shorecoil}$ is considered positive and equal to $v_m$ when the pod-coil would be shorted or fed by DC current.

The vehicle will be controlled such that during acceleration $\alpha$ from standstill, the vehicle's stator frequency represents a wave-speed from back to front, defined as $v_{shorecoil}$=80 m/s. Resulting in zero mechanical velocity $v_m$ when the on-board converter provides a frequency of −400 Hz to the pod-coil.

$$v_m = v_{podcoil} + v_{shorecoil} \tag{1}$$

$$v_{podcoil} = v_m - v_{shorecoil} \tag{2}$$

Equation (1) shows that both wave-speeds have equal magnitude and sign at standstill and that $v_{podcoil}>0$ while going forward on passive tracks where $v_{shorecoil}\approx 0$, and $v_{podcoil}<0$ is advantageous while accelerating in the doubly fed section. Important to realize is the mechanical thrust $\mathcal{F}$ (N) of the machine being equal to:

$$\mathcal{F} = ma \tag{3}$$

The mechanical power delivered to the pod equals the power from both active coils:

$$P_m = \mathcal{F}(v_{shorecoil} + v_{podcoil}) \tag{4}$$

Ignoring friction, the power $P_{track}$ delivered by the track stators and the power $P_{pod}$ delivered by the pod result into:

$$P_{track} = \mathcal{F} v_{shorecoil} \tag{5}$$

$$P_{pod} = \mathcal{F} v_{podcoil} \tag{6}$$

In forward direction ($v_{shorecoil}>0$ and $v_m>0$), two speed ranges can be defined: sub-synchronous when $v_m<v_{shorecoil}$ while $v_{podcoil}<0$, synchronous when $v_m=v_{shorecoil}$ (while $v_{podcoil}=0$) and super-synchronous when $v_m>v_{shorecoil}$ implying that $v_{podcoil}>0$. According to equation (6), the power delivered by the moving coil $P_{pod}$ to the pod is negative while sub-synchronous and can hence be used for charging the on-board battery. During standstill $v_{podcoil} = -v_{shorecoil}$ and the charging power is proportional to the mechanical trust $\mathcal{F}$.

According to equations (5) and (6), thrust and power are related, hence when standing still, exerting a force $\mathcal{F}$ by a mechanically brake to the rail, maximum power can be harvested to charge the on-board battery. The developed thrust is proportional to the charging power. When the capsule is moving, the charging power is proportional to pod-stator-wave-velocity $v_{podcoil}$ and thrust, so charging may continue up to the synchronous speed of for example 80 m/s. This speed depends on the pole-pitch and the electric frequency on the track-coils. The active doubly fed section is the most expensive part of the track, but basically only needs to be the length of the station, so only sub-synchronous operation will be used in practice.

When $P_{pod}<0$, the battery is being charged, when $P_{pod}>0$ the battery delivers power to the on-board stator and is producing mechanical power. The fraction of charging power over input power equals:

$$\frac{P_{pod}}{P_{track}} = \frac{v_m - v_{shorecoil}}{v_{shorecoil}} \quad (7)$$

As equation (7) shows, the charging power fraction can be kept high during acceleration when $v_{shorecoil}$ is kept sufficiently higher than $v_m$, the exit-speed from the active section. In the example setting with a station length of say 200 m, the exit speed of the doubly fed section will only be limited to a few tenths of m/s.

The LDFM is able to charge the on-board battery during standstill and during acceleration as long as sub-synchronous operation is valid. During deceleration charging is possible during over-synchronous operation.

Charging a coasting pod is theoretically possible but very ineffective since one minute of charging would require 16.7 km worth of active track (at 1000 km/h)! Having all energy for launch and drag on board before launch is most efficient, and allows the active part of the stator to be limited to just the length of the station-platform.

The active stator of the LDFM could be operated at one frequency only. Fundamental soft-switching square wave operation would be an option.

When carrying out LDFM operation, the track sections covered by the pod-mover need to be energized. Energizing more sections is allowed but not necessary. Selecting larger sections at the same time would be very well possible by connecting them in parallel, for example.

LSReIM Coasting Section

A linear solid steel structure with thick and thin segments distributed on one-pole-pitch intervals extending in longitudinal direction, results in a position dependent inductance value when seen from the moving coil of the vehicle. The Linear Synchronous Reluctance Machine, LSReIM, gets its thrust from the difference between $L_d$, the direct inductance, and $L_q$, the quadrature inductance, thrust is proportional to the square of the coil current, so a 0.5% thrust-level, needed to overcome the rolling drag and losses, would still require a less than 15% current level, for example. The power-efficiency of the LSReIM stator will be higher than a LIM stator, for example.

The LSRELM track only needs to overcome the small drag and may be designed such that it provides a reasonable amount of the peak thrust, allowing this type of inexpensive track to be used for the majority of the track-length.

LSRELM's efficiency is higher than LIM, for example, hence more suited for coasting and even breaking and acceleration. Entry and exit effects at an LSReIM are reduced in case solid iron is used. Laminations over the whole track are possible. The required flux level is low when a vehicle on wheels is used.

LSM Acceleration Section

A track-section composed of permanent magnets, PMs, with the proper pole-pitch to make the vehicle-track combination work as a 'short-stator' (here the coil on the pod is the stator) operates as a linear synchronous machine, LSM. LSMs can reach high energy-efficiency. The energy for further acceleration needs to be provided by the on-board battery as results from equations (1)-(6) and using $v_{shorecoil}=0$. The achievable propulsion power in the capsule will be in the order of 50-500 W/kg. Once the required cruise speed (for example 1000 km/h, potentially much higher) has been build up, the drag/lift ratio of the levitation system will determine the necessary power to maintain this speed over the remaining distance.

Figure 11A:
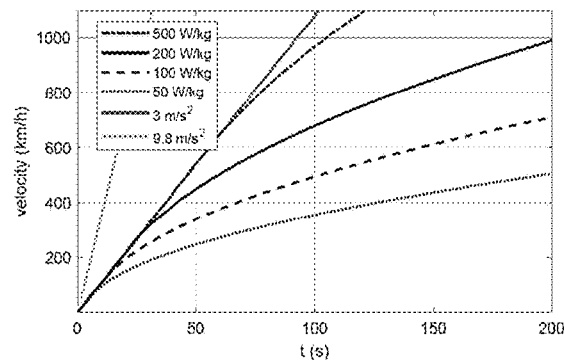
FIGS. 11a, 11b, 11c and 11d show curves of speed and launch length required for constant power launching, for various specific powers in accordance with the present disclosure.
Figure 11B:
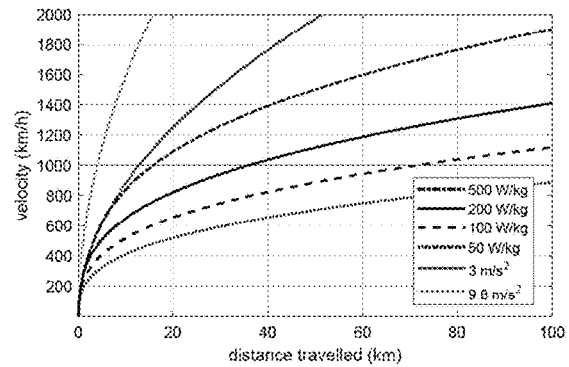
Figure 11C:
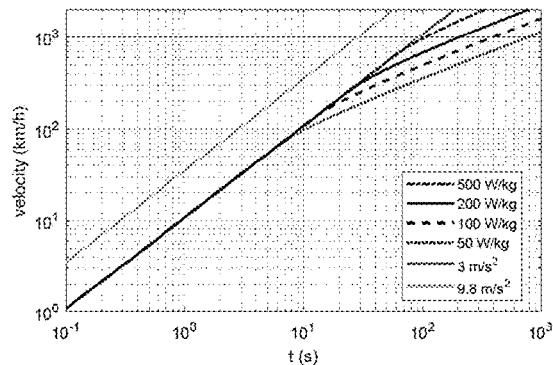
Figure 11D:
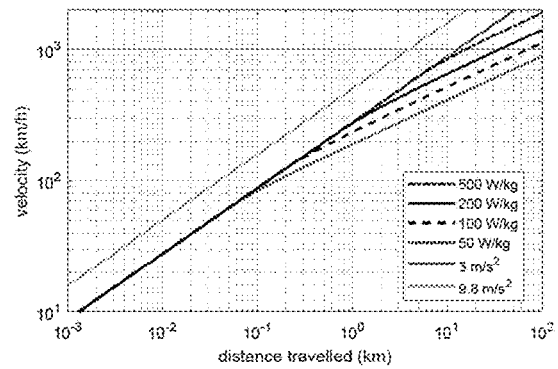

The necessary length of the PM track depends on the available specific power in W/kg. FIGS. 11a-d are graphs illustrating launch length required for constant power launching for various specific powers in W/kg, as captioned in the graphs. In FIGS. 11a-d, the starting acceleration is limited to 3.0 m/s². FIGS. 11a and 11c show, for the same data, the vehicle velocity v (km/h) versus launching time t (s) depicted on a linear scale in FIG. 11a and on a double-logarithmic scale in FIG. 11c. FIGS. 11b and 11d show, for the same data, the vehicle velocity v (km/h) versus launching length or distance travelled x (km), depicted on a linear scale in FIG. 11b and on a double-logarithmic scale in FIG. 11d.

For example at 500 W/kg a length of about 16 km will be needed to achieve the coasting speed of 1000 km/h, for 500 W/kg a distance of 36 km is needed. The PM layout can be such that a smaller percentage of the available poles on the track are equipped with magnets at larger distance from the station. In this way the LSM section can be operated under constant power which implies the lowest required battery and converter-weight and the Electro-Motive Force, EMF, can be kept reasonably constant at all speeds since the track can be designed to have a fixed speed-position profile.

After leaving the LSM section, the pod only needs to maintain its speed for the largest part of the journey. For an economic tube system, for example, the coasting power should be around an order of magnitude smaller than the acceleration power or less, enabling a simpler and less expensive passive track type to be suitable for coasting. Table 3 shows details of a worked-out example.

Analysis shows that the energy needed to overcome the drag along an ordinary trip exceeds the kinetic energy at top speed, hence it could be economic to only use the LDFM in the station, for charging the on-board electrical energy storage of the vehicle and gently move out of the station. An LSM section with decreasing number of magnets at greater distance from the station would be economic.

LIM Coasting Section

A Linear Induction Motor, LIM, emerges when an inexpensive conducting rail made of, for example, aluminium surrounds the pod-coil (see FIG. 3). LIMs are known for their poor efficiency (high slip) and their entry- and exit-effects at high speeds. Since only constant-speed-coasting is required in the longest section of the track, a lower efficiency should not be too troublesome. Advantages of the LIM operation are that speed adjusting remains possible, even energy regeneration during braking, although with a much lower efficiency than in an LSM and LDFM type liner motor mode of operation. A sensorless control method in the pod will be able to select the stator currents, such that thrust is continuously controllable; both acceleration and deceleration are possible in doubly-fed, LSM and LIM operation.

Entry and exit effects by the vehicle when moving in a LIM are limiting operation of LIMs at very high speeds. To lower the field-build up time, the effective magnetizing time constant needs to be (much) less than the passing time of the vehicle. The width of the aluminium strips of the track may be varied depending on speed, to manage the entry effects at the high speed track sections. At low speeds a thicker aluminium reaction strip is beneficial.

Sensorless field oriented control, for example, as disclosed in European Patent 1 162 106, the content of which is incorporated herein by reference, is able to estimate speed and torque or thrust in all machine types. Speed estimation in the LIM is not exact due to the uncertainty in the actual slip (effective rotor resistance is not known exact). The LSReIM has precise sensorless speed estimation. It would also be easier to generate considerable thrust in case the pod would need to restart from a position somewhere along the track where only LSReIM stator would be present. The LSReIM has, just like the LIM, the ability to control the linked flux over a wide range, which is perfect for constant power acceleration: the voltage is kept constant while the frequency increases, hence reducing the flux and therefore reducing thrust $\mathcal{F}$, keeping the product of speed and thrust constant.

Only Rails

In the case of tube transport, the pod-coil is able to travel in vacuum and will be loss-free when switched off. Since drag on wheels is very low (0.001 to 0.004), not much force is needed to keep rolling, providing the possibility of leave out the track for coasting all together. Thus, replacing a linear induction motor for a rotating shaft spinning and driving wheels of the vehicle at an agreeable speed of 5000-6000 rpm, for example, present in the vehicle itself.

'Winding up' a LIM track of hundreds of km length into a round commercially available induction motor is advantageous in terms of saving cost and complexity. An additional inverter would provide redundancy and a way to stay moving to a safe position in case of trouble with the linear propulsion system or a station during black-out, for example. The advantage of using an induction motor as a speed-keeper is that losses are close to zero when its stator is switched off during the operation of the high thrust linear propulsion system. By leaving away the track and just keeping the rails to ride on, the means for creating high force are gone. Hence additional means for braking safely will need to be added, either to the wheels or use a conducting fin as an eddy-current brake to dissipate the heat in the track and not in the pod.

Thus, in case the pod has wheels, such as wheels having a diameter in the range of 1 m, it is very beneficial to install a small induction motor in a direct-drive fashion to the axle of a wheel pair. It can be shown that less than 40 Nm/1000 kg weight of the pod is required to have the pod to keep its speed. A small motor is sufficient for this purpose. Powering such a motor with a separate converter is advisable. In this way, there will be a redundant drive system available to move the pod also in case of issues with or defects of the linear drive system or a station in black-out condition.

Advantages of the proposed multi-mode machine type are the possibility to combine the advantages of the mentioned track-types using the same pod with just different controls for each track-type.

Constant Acceleration Launch

When launching a capsule from $v_0$ to $v_{ref}$, the general equations according Newton's laws with acceleration $\alpha$ (m/s$^2$), velocity v (m/s) and position x (m) with time t (s) are:

$$v(t) = \int_0^t \alpha(\tau) d\tau \tag{8}$$

$$x(t) = \int_0^t \int_0^t \alpha(\tau) d\tau dt = \int_0^t v(\tau) d\tau \tag{9}$$

Related variables are capsule mass $m_c$ (kg), thrust $\mathcal{F}$ (N) and power p (W).

$$\mathcal{F}(t) = m_c \alpha(t) \tag{10}$$

$$p(t) = v(t) \mathcal{F}(t) = v(t) \alpha(t) m_c \tag{11}$$

In case of constant acceleration equations (8) to (11) boil down to:

$$p(t) = m_c \alpha^2 t \tag{12}$$

Now insert the goal that $v_{ref}$ is the final speed, then the general requirements can be formulated:

$$t_1 = \frac{v_{ref}}{a} \tag{13}$$

$$x_1 = \frac{v_{ref}^2}{2a} \tag{14}$$

$$p_1 = m_c a v_{ref} \tag{15}$$

$$W_1 = \frac{1}{2} m_c v_{ref}^2 \tag{16}$$

In case a=g=9.81 m/s$^2$ and final speed equals 1000 km/h=278 m/s, the duration of the launch according to equation (13) would be $t_1$=28.3 s and the required distance according to equation (14) equals $x_1$=3.933 km, the maximum specific mechanical power required is 2.725 kW/kg. In an example of a pod with $m_c$=2000 kg, this would be 5.45 MW delivered to approximately 6 m of active track during a stator-cover-time of about 22 ms. This power needs to be supplied by each of the sections in the high-speed part of the launch. Launching with constant acceleration poses an enormous power requirement at the end of the launch track. Since peak-power and cost go hand in hand, this way of control will be very expensive, regardless of the motor-design.

Constant Power Launch

Instead of constant acceleration, an option of constant power is also possible. Starting with equation (16), a condition of constant power implies energy or work W (Joule) to be proportional with time. The variables are: work (W), power during constant power ($p_{cp}$) and the corresponding velocity $v_{cp}$ as a function of time t, ($t_0$ is the moment of start), $v_0$ the velocity at t=$t_0$:

$$v_0 = v(t_0) \tag{17}$$

$$W = p_{cp} \cdot (t - t_0) = \frac{m_c}{2} (v_{cp}^2 - v_0^2)$$

Equation (17) can be rewritten into an expression for the velocity that results from constant power $p_{cp}$ operation:

$$p_{spec} = \frac{p_{cp}}{m_c} \quad (18)$$

$$v_{cp} = \sqrt{2p_{spec} \cdot (t - t_0) + v_0^2} \quad (19)$$

Assuming $v_0=0$, the resulting acceleration is the time-derivative of equation (19):

$$a_{cp} = \frac{1}{\sqrt{(t-t_0)}} \sqrt{\frac{p_{spec}}{2}} \quad (20)$$

From equation (20) it can be seen that the acceleration is unlimited for very small values of t, hence the actual $a_{cp}$ needs to be limited to the highest acceleration allowable or possible, i.e. $a_{max}$. When limiting the acceleration to $a_{max}$, the first part of the launch will be constant acceleration mode until the transition moment $t_T$ at which the intended constant power operation starts:

$$t_T = \frac{p_{spec}}{a_{max}^2} \quad (21)$$

For all tube transport type applications $t_T$ will be a fraction of a second to one minute at the most, since high final speeds are intended, the limitation of acceleration is ignored to simplify the following analysis. Now all expressions are ready to compare the constant power mode with the constant acceleration mode. Using (19), the time to reach $v_{ref}$ equals:

$$t_{cp1} = \frac{v_{ref}^2}{2p_{spec}} \quad (22)$$

and $$x_{cp1} = \frac{v_{ref}^3}{3p_{spec}}$$

For constant power launch (ignoring the very first part of the launch), the time functions for $\alpha(t)$ and its time integral $v(t)$ and time integral again into $x(t)$ can be summarized according:

$$a_{cp}(t) = t^{-\frac{1}{2}} \sqrt{\frac{p_{spec}}{2}} \quad (23)$$

$$v_{cp}(t) = t^{\frac{1}{2}} \sqrt{2p_{spec}} \quad (24)$$

$$t(x) = x^{\frac{2}{3}} \left(\frac{9}{8p_{spec}}\right)^{\frac{1}{3}} \quad (25)$$

Substituting equation (25) into equations (23) and (24) results in:

$$v_{cp}(\chi) = (3p_{spec}\chi)^{1/3} \quad (26)$$

$$\alpha_{cp}(\chi) = (p_{spec}\chi)^{2/3}(3\chi)^{-1/3} \quad (26)$$

Equations (26) and (27) describe the speed and acceleration as a function of position during constant power operation.

Travel-Time and Specific Power

To check the effect of specific power (W/kg) on total travel time, the following simulations have been carried out. All launches start with maximum acceleration of 3 m/s² and continue with constant power till the goal speed is reached. At the half-way point the sequence is reversed. Once the goal-speed of 1000 km/h is reached, coasting starts. Slowing down goes in the opposite order.

FIGS. 12a-d illustrate specific curves of the speed and acceleration as a function of position during constant power operation, for a short trip of 100 km and various power values (W/kg), as captioned in the figures.

Figure 12A:
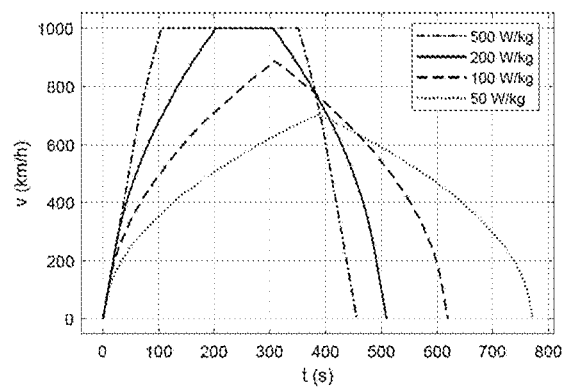
FIGS. 12a, 12b, 12c and 12d show curves of speed and acceleration as a function of position during constant power operation, for a short trip of 100 km.
Figure 12B:
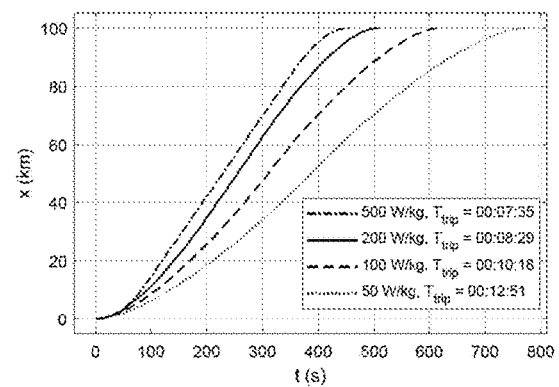
Figure 12C:
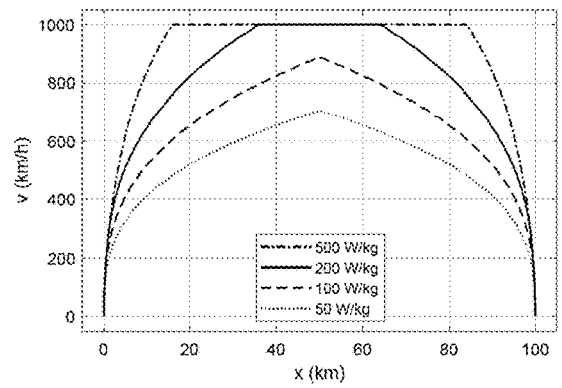
Figure 12D:
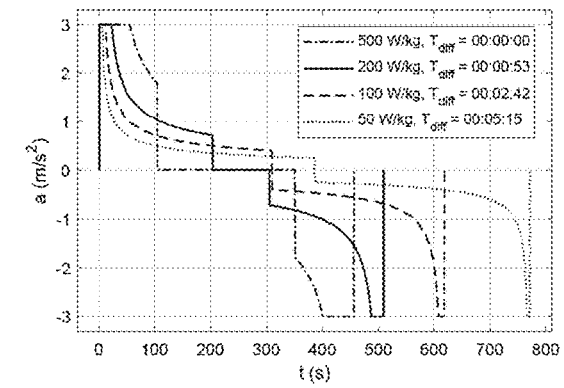
Figure 13A:
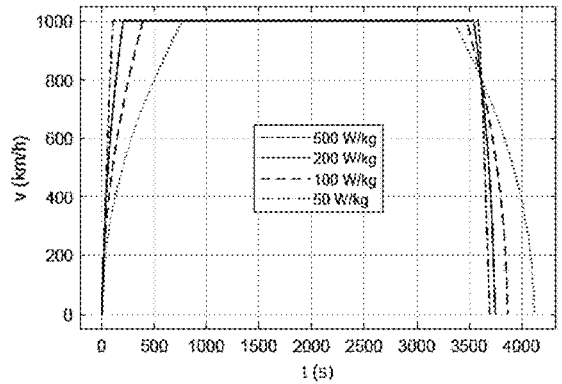
FIGS. 13a, 13b, 13c and 13d show curves of speed and acceleration as a function of position during constant power operation, for a trip of 1000 km.
Figure 13B:
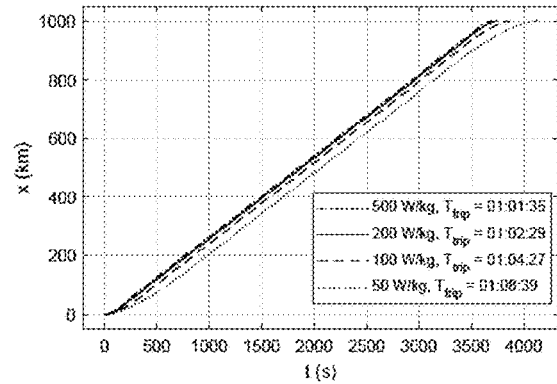
Figure 13C:
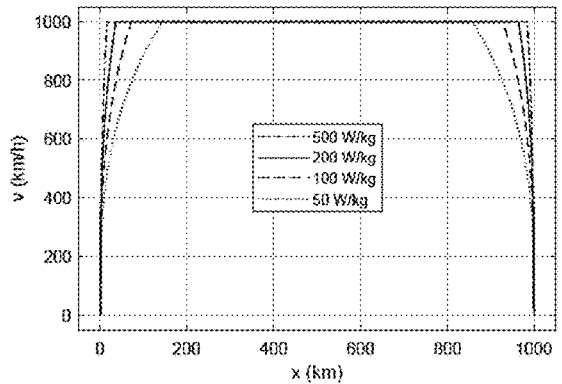
Figure 13D:
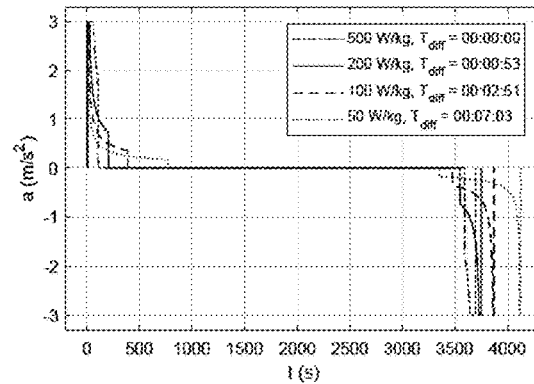

FIG. 12a shows, at a linear scale, the speed or velocity v (km/h) reached by the vehicle as function of time t (s). FIG. 12b shows, at a linear scale, the distance x (km) travelled by the vehicle as function of time t (s). FIG. 12c shows, at a linear scale, the speed or velocity v (km/h) reached by the vehicle as function of the distance x (km) travelled. FIG. 12d shows the acceleration $\alpha$ (m/s²) of the vehicle as a function of time t (s).

FIGS. 13a, 13b, 13c and 13d illustrate, graphically, similar curves as described above for FIGS. 12a, 12b, 12c and 12d, respectively, during constant power operation, for a trip of 1000 km.

The results from FIGS. 12a-d and 13a-d show travel times between 7:35 and 12:51 minutes over 100 km, and for a trip of 1000 km the travel times range between 1:01 and 1:08 hours, which is pretty fast. An order of magnitude increase of specific power from 50 W/kg to 500 W/kg only results in a mere 7 minutes and 3 seconds shorter trip-time on the total of about one hour. The difference in travel time $T_{diff}$ (shown numerically in FIGS. 12b and 12d and FIGS. 13b and 13d, originates in the acceleration and deceleration sections of the trip and therefore hardly depends on the total distance travelled.

High specific power has small benefits on travel-time. Only 53 seconds gain is found on a 1000 km trip when going from 200 W/kg to 500 W/kg. Even when going down to 50 W/kg (twice the value of a TGV train), the travel time is only 7 minutes more than with 10 times the power on board. Hence specific power comparable to that of a regular e-car is sufficient for fast and competitive tube-transport.

Since total power usually is proportional to cost, by limiting the specific power to a practical and economic number, with sufficiently low drag, one will get at its destination with minimal energy use only a fraction later than in a high-cost high power system.

In case an on-board energy storage or buffer and on-board power electronics are chosen, and since the on-board energy storage is limited in its output power, designing for a predominantly 'constant-power launch' utilizes the system components more efficient. Specific power levels of only 100 W/kg, regular values of present electric vehicles for road or street use, are sufficient for fast and efficient long distance tube-transport.

Diluted Magnets

Assuming a constant-power launch, the coupled flux from permanent magnets may be diluted along the track to achieve progressive field-weakening and hence constant voltage and constant current operation throughout most of the acceleration stretch. If we assume the coupled magnetic flux $\Psi(x)$ to be a function of the position x, then keeping the power constant would imply, using ni being the ampere-turns of the pod's-short-stator winding:

$$p_{ep} = \frac{m_c a_{cp} v_{cp}}{f} = \frac{\psi(x) ni v_{cp}(x)}{f}$$

$$\psi(x) = \frac{m_c a_{cp}(x)}{ni}$$

-continued $$\psi(x) = \frac{1}{ni} \left( \frac{m_c p_{cp}^2}{3} \right)^{\frac{1}{3}} x^{-\frac{1}{3}}$$

The total amount of flux (number of magnets along the track) $\Psi_{total}$ is proportional to the total kinetic energy to be delivered, independent of specific power $p_{spec}$. Lower power implies a longer track with thinner magnets, keeping the total magnet volume and possibly cost equal;

$$\psi_{total} = \frac{3}{2ni} \left( \frac{m_c p_{cp}^2}{3} \right)^{\frac{1}{3}} \left[ x^{\frac{2}{3}} \right]_0^{x_{cp1}} \quad (28)$$

$$x_{cp1} = \frac{m_c v_{ref}^3}{3 p_{cp}} \quad (29)$$

Now combining the last two equations (28) and (29) yields:

$$\psi_{total} = \frac{m_c v_{ref}^2}{2ni} \quad (30)$$

Equation (30) shows that the total amount of magnets is proportional to the square of the final speed $v_{ref}$ but not a function of the total mass $m_c$ of the pod, as long as each pod with mass $m_c$ has its own active primary with ni current. Note that equation (30) is applicable in general, even for non-constant power launches.

It can be shown that for constant ni, the total coupled flux $\Psi_{total}$ along the track is only determined by the kinetic energy, i.e. $m_c v^2_{ref}$ ni and the stator length l.

The optimal frequency for the fixed stator coils would be preferably close to the cross-over point from constant acceleration to constant power, which is equal to:

$$v_{shorecoil} \approx \frac{p_{spec}}{a_{max}} [m/s] \quad (31)$$

$$f_{shorecoil} \approx \frac{p_{spec}}{2\lambda a_{max}} [Hz]$$

With the example values in Table 3, the frequency $f_{shorecoil}$ would be 334 Hz (being the lowest frequency with maximum power). At this frequency in a station at standstill the pod receives the rated power for charging at rated current. At 400 Hz in the example, available charging power will be higher at rated current.

A lower specific power causes a longer time and distance before the target speed is reached. The total amount of necessary magnet material however is comparable, it means thinner magnets over a longer stretch.

Using a pod-coil with equal length as the vehicle will minimize the number of necessary magnets while allowing trains of pods to be configured to reach the necessary travel capacity.

General Considerations

An important conclusion from equation (22) is that required launch-distance is inversely proportional to the used specific power $p_{spec}=p_{cp}/m_c$ (W/kg) and proportional to the final speed cubed. In case a long-stator topology is used, the power times distance product is constant for a given launch speed and mass for all powers. This implies that a shorter launch track with higher power per section will have comparable cost as far as power electronics is concerned. For safety reasons, the whole track will need to have some means of propulsion. How that is envisioned, is an important question for a challenging design based on passive pods.

For the active pod alternative, the cost and weight of the pod is reduced when lower power is chosen. A lower acceleration power of the pod will lower the required weight of the copper coils, and reduce the cooling needs for the coils in vacuum. Equation (30) show that the volume of required magnets depends on final speed $(v_{ref})^2$ and ni. Hence a lower power rating seems to lower the cost, but increase the travel time only by a little, see FIGS. 12 and 13.

Table 1 shows some common modes of transport and their specific power values. As an example the Tesla Roadster™ achieves 174 W/kg (215 kW and 1235 kg), the Toyota Prius™ achieves 72 W/kg and only in a small range of speeds. A reasonable battery-weight percentage and battery quality will make specific power values between 100-500 W/kg for the pod possible, but battery efficiency strongly deteriorates at shorter discharge times.

TABLE 1

Comparison of specific power (W/kg) for different means of transport.

| item | $p_{spec}$ (W/kg) | duration |
|---|---|---|
| horse | 1 . . . 2 | hours |
| human body | 1 . . . 20 | hours . . . seconds |
| TGV train | 16 . . . 25 | |
| Toyota Prius | 72 | |
| Tesla Roadster | 174 | |
| Boeing 747 | ≈250 | |
| spaceX rocket | ≈10 × 10³ | minutes |

Total Energy Use Per Trip

Drag

First assume a vehicle having a perfect battery as on-board electric energy storage, a perfect motor and a perfect power converter yielding 100% efficiency from battery to mechanical propulsion and vice versa. In that case, the energy during acceleration will be fully recovered during deceleration back to the initial speed (standstill). Based on this assumption, the only energy lost is the drag-force (N) integrated over the distance (m) gives (Nm) also known as Joule.

Rolling Resistance

Two major sources of drag-force exist in ordinary traffic: 'rolling resistance' and air-resistance. The latter is supposed to be negligible in an evacuated tube which leaves the 'rolling resistance', 'flying resistance' or 'levitation resistance' all called drag to dominate in the tube transport case. As shown in Table 2, different wheel plus track combinations result in different $C_\pi$ (rolling resistance constant) values.

The total energy (work) $W_d$ lost to drag during the trip with length $\Delta x$ can be calculated, using g=9.81 N/kg, lift L in (N) and drag D in (N) according:

$$L = m_c g \quad (33)$$

$$D = C_{rr} L$$

$$W_d = \underbrace{m_c g}_{[N]} C_{rr} \underbrace{\Delta x}_{[m]}$$

$$\frac{W_d}{m_c} = g \underbrace{C_{rr} \Delta x}_{[J/kg]}$$

-continued $$\Delta x = \frac{W_d}{m_c g \, C_{rr}}$$

The maximum energy density of a LiPo battery is about 0.72 MJ/kg, equal to 200 Wh/kg. When a maximum battery weight fraction of 12.5% is assumed, the maximum range on just the battery, starting at cruse-speed would result into:

$$W_{Sbat} \approx 0.72 \cdot 10^6 \, \text{J/kg} \tag{34}$$

$$\Delta x \leq \frac{0.125 \, m_c 0.72 \cdot 10^6}{m_c \, g C_{rr}} = \frac{g \cdot 10^4}{g \, C_{rr}} \, [\text{m}]$$

$$C_{rr} \leq \frac{9 \cdot 10^4}{g \Delta x} \approx \frac{10 \text{km}}{\Delta x}$$

This implies about 9 km range when $C_\pi=1$, which means going straight up. To reach a destination at say 1000 km distance on a full battery, equation (34) shows that the effective rolling resistance (still some air-friction will remain at very low pressure level) should be less than one percent, a value achievable with wheels. For a feasible long distance tube transport system, low friction is of paramount importance!

Rolling Resistance Coefficient Examples

Table of rolling resistance coefficient examples: (http://auto.howstuffworks.com/tire4.htm)

TABLE 2

Drag per lift $C_{rr} = D/L$ for wheels. Magnetic levitation (EDS) yields about $C_{rr} = 0.2$ (slow) down to $C_{rr} =$ 0.005 at 500 km/h (inductrac specifications from Richard F. Post, Maglev: A New Approach, Scientific American, January 2000).

| $C_{rr}$ | b | Description |
|---|---|---|
| 0.0003 to 0.0004[16] | | "Pure rolling resistance" Railroad steel wheel on steel rail |
| 0.0010 to 0.0024[17][18] | 0.5 mm[2] | Railroad steel wheel on steel rail. Passenger rail car about 0.0020[19] |
| 0.001 to 0.0015[20] | 0.1 mm[2] | Hardened steel ball bearings on steel |
| 0.0019 to 0.0065[21] | | Mine car cast iron wheels on steel rail |
| 0.0022 to 0.005[22] | | Production bicycle tires at 120 psi (8.3 bar) and 50 km/h (31 mph), measured on rollers |
| 0.0025[23] | | Special Michelin solar car/eco-marathon tires |
| 0.005 | | Dirty tram rails (standard) with straights and curves |
| 0.0045 to 0.008[24] | | Large truck (Semi) tires |
| 0.0055[23] | | Typical BMX bicycle tires used for solar cars |
| 0.0062 to 0.015[25] | | Car tire measurements |
| 0.010 to 0.015[26] | | Ordinary car tires on concrete |
| 0.0385 to 0.073[27] | | Stage coach (19th century) on dirt road. Soft snow on road for worst case. |
| 0.3[26] | | Ordinary car tires on sand |

For example, in earth gravity, a car of 1000 kg on asphalt will need a force of around 100 newtons for rolling (1000 kg × 9.81 m/s² × 0.01 = 98.1 N).

Suspension/levitation losses
Electro Dynamic Suspension

Electro Dynamic Suspension, EDS, is a passive magnetic levitation system based on repulsing forces. EDS consists of vehicle-connected Hallbach arrays of magnets, and a conducting plate or short-circuited coils in the track start to repel at a low lift-off speed. From a physical point of view it works like this: The magnet can be considered as a superconducting winding with high a built-in current. Above levitation speed, this built-in current i is mirrored into the reaction plate, the losses in the plate are $i^2 R$ and are basically independent of speed. Levitation loss can therefore be regarded as a loss with constant power (p=v×F), which implies that the braking force (drag) reduces proportional with speed. It also implies that total lost energy is proportional to flying time which implies that the highest speed is most efficient. Skin-effect in the reaction plate makes things worse at higher frequencies, causing the drag force to increase proportional to one over square-root (v).

Coulomb friction behaves like a constant force, lost energy is proportional to travelled distance, not a function of speed. The speed where levitation losses equal rolling-losses can now easily be calculated, based on the optimistic numbers given in Richard F. Post, Maglev: A New Approach, Scientific American, January 2000 (using expensive Litz-wire coils in the track):

$$\frac{p_{iev}}{m_c} \approx \frac{500 [\text{km/h}]}{3.6} g \frac{1}{200} \approx 7 [\text{W/kg}]$$

The speed for wheels where the rolling losses become equal to 7 W/kg equals $$vgC_{rr} = \frac{p_{iev}}{m_c} \tag{35}$$

$$v = \frac{7}{gC_{rr}} \, [\text{m/s}]$$

Equation (35) shows that a good wheel with $C\pi=0.002$ has equal drag loss as magnetic levitation at a speed of =360 m/s equal to =1300 km/h. For all lower speeds proper wheels on a smooth track will be more energy-efficient than magnetic levitation. And most likely also a lot less expensive. Using a solid aluminium plate instead of Litz-wire coils increases the levitation losses to over 40 W/kg even with optimized Hallbach-array magnets. The repelling character of this passive levitation requires that all magnetic steel needs to be sufficiently distanced from the Hallbach arrays, which may impose tube-construction challenges.

Electro Magnetic Suspension

Electro Magnetic Suspension, EMS, is an active configuration that is based on (unstable-) attractive forces due to a magnetic core, attached to the vehicle and excited by a winding with controllable DC current. By also including a bias-magnet, the necessary current can be reduced. By tuning the magnet size and separation, the excited coil's power lost can be kept manageable, however the construct can carry no more than about 30 times its own weight. Another issue is the necessity of a reaction rail in the track. In order to keep eddy-current losses and lifting force manageable, the reaction rail needs to be made from laminated iron and will be more expensive per meter than a solid aluminium plate.

Super-Conducting Magnetic Suspension

The Maglev in Japan operates with Super-Conducting Magnetic Suspension, SCMS, at costs of about 100 G$ per 500 km: 200 M$/km, 200 k$/m. The Japanese Maglev train starts to levitate above 140 km/h, indicating a high percentage of drag at the intentional 500 km/h. The need for Maglev suspension seems to have no physical advantage. Steel wheels on steel tracks can do the same much more efficient and have record speeds over 500 km/h as well.

Suspension on Wheels

Wheels on a smooth track can run very efficiently, with $C_\pi$=0.0003-0.002 (see Table 2). None of the magnetic suspension solutions even come close. A 'green' solution therefore needs to regard wheels before the magnetic options. Since the contact point of a wheel is standing still, the top of the wheel travels with the double vehicle velocity relative to the surrounding air. In a perfectly evacuated tube, a wheeled vehicle can travel above half the speed of sound without causing shock-waves. Even in air, wheel based vehicles have proven to be able to exceed the speed of sound in a jet-engine propelled car, hence it is mechanically feasible to design suitable wheels for speeds around 1000 km/h and even higher. Taper on threads and avoiding hunting phenomena on wheels is proven technology. Since this solution does not need much traction, all efforts can be put to reducing drag and optimize damping during tracking the mechanical 'noise' in the rails.

Speed and Drag

Comparing the kinetic energy $W_k$ and the drag-energy $W_d$:

$$W_k = \frac{1}{2} m_c v_m^2 \tag{36}$$

$$W_d = m_c g C_{rr} \Delta x$$

$$\frac{W_d}{W_k} = \frac{2g C_{rr} \Delta x}{v_m^2}$$

For an example speed of 1000 km/h (278 m/s), the kinetic energy $W_k$=38.6 kJ/kg is equivalent to lifting the vehicle by a good portion of Mont Blanc: 3864 m. This implies that with a $C_\pi$=0.01 being L/D=100, a distance of 100×3.864 km=386.4 km would correspond to the kinetic energy of the example speed, being equal to the distance travelled before the pod would stop without any further propulsion. In principle, tube transport is designed for much larger distances. Required battery weight (energy) in this example is dominated by the friction coefficient $C_\pi$ for all usable distances (>400 km), which implies that for energy efficient travel $C_\pi$ should be much smaller than 1%. FIG. 2 shows that such values are achievable by using wheels and rails instead of magnetic levitation. Another interpretation of equation (36) implies that you need to drop in free-space by 3.8 km to reach a velocity of 278 m/s.

Air Drag

Although the tube is supposed to be evacuated, some air will still remain. The general drag equation for compressible glass equals:

$$\mathcal{F} = \frac{1}{2} \rho v_m^2 C_D A \tag{37}$$

Check at which density point p the air-friction equals the rolling resistance, assuming $m_c$=2000 (kg), $C_D A \approx 1$ (m2):

$$\mathcal{F}_a \leq 0.002 m_c g \tag{38}$$

$$\rho \leq \frac{0.004 \, m_c g}{v_m^2 C_D A} \approx 0.001 \, [kg/m^3]$$

Equation (38) implies that at 1000 km/h the air-pressure in the tube should not be much higher than about 0.1% of the normal atmospheric pressure. Absolute pressure being approximately 100 Pa, named a medium vacuum.

Leakage Losses

Energy lost to leaking air into the evacuated tube is described by $$W_{air} = (p_1 - p_0) \Delta V \tag{39}$$

For 1000 km travel, one person would waste about 2.5 kWh=9 MJ of drag-energy. The hydraulic energy would be equal to the energy of the trip when 90 m3 of air would be leaked per person per 1000 km. Dependent on a vacuum pump efficiency, the requirement for making and keeping the vacuum may significantly add to the overall energy costs.

Power Source in Pod/Capsule/Shuttle

The specific energy required for a launch is given in equation (16). This equation can be inverted when we assume $W_{Sbat}$ to represent the specific energy of the battery and $m_{bat}$ the total battery weight inside the pod:

$$W_{bat} = m_{bat} W_{Sbat} \tag{40}$$

$$v_{max}^2 = \frac{2 m_{bat} W_{Sbat}}{m_c}$$

$$k_{bat} = \frac{m_{bat}}{m_c}$$

$$v_{max} = \sqrt{2 W_{Sbat} k_{bat}}$$

Equation (40) reveals that with a specific energy of a good battery as on-board energy storage (such as a lithium-ion-polymer or lithium-polymer, LiPo, battery: $W_{Sbat} \approx 0.72$ MJ/kg (200 Wh/kg)) and a battery-weight fraction of $k_{bat}$=12.5%, a maximum speed of 424 m/s (1527 km/h) can be reached, assuming no friction and perfect system components.

Specific Power

Beside specific energy $W_{Sbat}$, specific power $P_{Sbat} = p_{peak}/m_{bat}$ of batteries is an important characteristic. The best performing type is LiPo, commonly used in model aircraft and many electric vehicles. LiPo has a very high specific power.

Discharge rates of 20° C. (3 minutes) are achievable. This amounts to $P_{Sbat}$=20 $W_{Sbat}$/3600 s≈4 kW/kg. The specific power of the battery can be expressed into a specific power of the whole capsule by:

$$p_{spec} = \frac{p_{max}}{m_c} = k_{bat} P_{Sbat} \tag{41}$$

With a modest battery weight fraction of $k_{bat}$=12.5%, a specific power for the total capsule of $p_{spec}$=0.5 kW/kg could be reached, this would imply 1000 kW for a 2000 kg capsule that carries 250 kg of LiPo batteries. This number would give impressive performance and reasonable launch length and track cost (see FIGS. 11a-d).

During deceleration most of the mechanical energy will be converted and pumped back into the on-board LiPo batteries, hence a reasonable amount of energy will not need to be charged at the station. Only the cycle loss needs to be replenished. No need for feeding while launching or breaking since the battery is capable to do the work on its own. As discussed, the effective drag coefficient $C_\pi$ will dominate the total energy use on most journeys.

As shown in Table 1, general passenger trains have specific powers in the order of 10 W/kg, high speed trains (TGV) 16-25 W/kg, commercial aircraft like a Boeing 747 (about 80 MW (4×200 kN×100 m/s) per 320·10³ kg) are in the order of 250 W/kg. A large size rocket like the spaceX accelerating with about 20 m/s² at a speed of 5000 m/s shows a specific power in the order of 10000 W/kg. In the next section will be shown that little gain in total travel time is found by increasing the specific power when the top speed is limited to 1000 km/h.

Energy Per Unit Distance

Roughly speaking, when only considering a rolling resistance $C_\pi=0.002$, the lowest energy lost equals:

$$\frac{W}{\Delta x} = C_{rc}m_c g \approx 20 \ [J/(kgkm)] \tag{42}$$

For a pod with $m_c=2000$ kg, this amounts to 40 kJ/km which is equal to a mere 11.2 Wh/km. In terms of fuel-efficiency this is roughly 340 km/litre or 0.3 litre/100 km if a 30% fuel to electricity efficiency is assumed. These are fantastic numbers. Although overhead is left out of the equation, the transport losses seem potentially very low.

In the ideal case of no friction or drag, specific energy and specific power of present LiPo batteries is sufficient to launch a capsule up to very high speeds depending on the battery weight fraction of the capsule. If 50% is assumed the maximum, 2800 km/h would be the theoretical limit. Using the disclosure, the starting speed of full battery operation can be designed to be quite high (when using a long LDFM part), hereby further increasing the maximum speed. In practice the drag from levitation or wheels will limit the range.

Range

Equations (42) and (36) result in an expression for range:

$$W_{bat} = m_{bat} W_{Sbat} \tag{43}$$

$$k_{bat} = \frac{m_{bat}}{m_c}$$

$$W_k = \frac{1}{2} m_c v_m^2$$

$$W_d = m_c \, g \, C_{rr} \Delta x$$

$$k_{bat} m_c W_{Sbat} = m_c \left( \frac{v_m^2}{2} + g \, C_{rr} \Delta x \right)$$

$$k_{bat} W_{Sbat} - \frac{v_m^2}{2} = g C_{rr} \Delta x$$

$$\Delta x = \frac{k_{bat} W_{Sbat} - \frac{v_m^2}{2}}{g \, C_{rr}}$$

The range in equation (43) results, using 12.5% battery fraction and $W_{Sbat} \approx 0.72$ MJ/kg in a range of 2.600 km.

Traffic Considerations

Tube Capacity

From general traffic considerations, the capacity of a channel is measured by the number of vehicles that passes at one particular spot along the road, track, canal or tube: $\Phi_{tube}$ (vehicles/s). In the next part the maximum traffic flow-rate in a single tube with multiple capsules is calculated. In particular when constant-power-operation is incorporated.

Minimal Separation Distance

Suppose at $t=t_0$ two capsules in the tube, one at $x_{tail0}$ with speed $v_{tail0}$, the other at $x_{head0} > x_{tail0}$ with steady speed $v_{tail0} > v_{head0}$. Based on the general equation for constant power mode, the smallest no-collision separation distance can be calculated using equation (17), assuming the head pod to coast and the tail pod to brake with specific power $p_{spec}$ it takes $T_{break}$ seconds to reach equal speeds. Index 0 is used for the initial value and index 1 is used for the situation where the speed of the tail pod equals the speed of the head pod:

$$T_{break} = \frac{v_{tail0}^2 - v_{head0}^2}{2 p_{spec}} \tag{44}$$

$$x_{head}(t) = x_{head0} + v_{head0} t \tag{45}$$

$$x_{head1} = x_{head0} + \frac{v_{tail0}^2 v_{head0} - v_{head0}^3}{2 p_{spec}} \tag{46}$$

$$v_{tail}(t) = \sqrt{-2 p_{spec} t + v_{tail0}^2} \tag{47}$$

$$x_{tail}(t) = \int v_{tail}(t) dt + x_{tail0} \tag{48}$$

The primitive function of equation (47) is the following:

$$x_{tail}(t) = \frac{-2}{3.2 p_{spec}} \sqrt{\left(-2 p_{spec} t + v_{tail0}^2\right)^3} + x_{tail0} + C$$

Simplifying yields:

$$x_{tail}(t) = -\frac{1}{3} \sqrt{\frac{1}{p_{spec}^2}\left(-2 p_{spec} t + v_{tail0}^2\right)^3} + x_{tail0} + C$$

Correcting for the value for t=0, C can be found:

$$x_{tail}(t) = -\frac{1}{3} \sqrt{p_{spec}\left(-2t + \frac{v_{tail0}^2}{p_{spec}}\right)^3} + \frac{v_{tail0}^3}{3 p_{spec}} + x_{tail0}$$

The position travelled to reach $v_{tail}=v_{head}$ can be calculated by substituting (44) into (49) with $t=T_{break}$ $$x_{tail1} = -\frac{1}{3} \sqrt{p_{spec}\left(-2 \frac{v_{tail0}^2 - v_{head0}^2}{2 p_{spec}} + \frac{v_{tail0}^2}{p_{spec}}\right)^3} + \frac{v_{tail0}^3}{3 p_{spec}} + x_{tail0}$$

$$x_{tail1} = -\frac{1}{3} \sqrt{p_{spec}\left(\frac{-v_{tail0}^2 + v_{head0}^2 + v_{tail0}^2}{p_{spec}}\right)^3} + \frac{v_{tail0}^3}{3 p_{spec}} + x_{tail0}$$

$$x_{tail1} = -\frac{1}{3} \sqrt{p_{spec}\left(\frac{v_{head0}^2}{p_{spec}}\right)^3} + \frac{v_{tail0}^3}{3 p_{spec}} + x_{tail0}$$

$$x_{tail1} = -\frac{1}{3} \sqrt{\frac{v_{head0}^6}{p_{spec}^2}} + \frac{v_{tail0}^3}{3 p_{spec}} + x_{tail0}$$

$$x_{tail1} = \frac{v_{tail0}^3 - v_{head0}^3}{3 p_{spec}} + x_{tail0}$$

To avoid a collision, the following needs to be true: $x_{tail1} \leq (x_{head1} - L_{pod})$ assuming the pod's length is $L_{pod}$ (m). Equation (45) is valid, yielding:

$$x_{head1} = x_{head0} + \frac{v_{tail0}^2 v_{head0} - v_{head0}^3}{2 p_{spec}} \tag{49}$$

$$x_{tail1} \leq (x_{head1} - L_{pod})$$

$$x_{tail1} = \frac{\left(v_{tail0}^3 - v_{head0}^3\right)}{3 p_{spec}} + x_{tail0}$$

-continued $$\frac{(v_{tail0}^3 - v_{head0}^3)}{3p_{spec}} + x_{tail0} \leq x_{head0} + \frac{v_{tail0}^2 v_{head0} - v_{head0}^3}{2p_{spec}} - L_{pod}$$

$$x_{tail0} - x_{head0} \leq \frac{v_{tail0}^2 v_{head0} - v_{head0}^3}{2p_{spec}} - \frac{(v_{tail0}^3 - v_{head0}^3)}{3p_{spec}} - L_{pod}$$

$$x_{tail0} - x_{head0} \leq \frac{3v_{tail0}^2 v_{head0} - 3v_{head0}^3 - 2v_{tail0}^3 + 2v_{head0}^3}{6p_{spec}} - L_{pod}$$

$$x_{tail0} - x_{head0} \leq \frac{3v_{tail0}^2 v_{head0} - v_{head0}^3 - 2v_{tail0}^3}{6p_{spec}} - L_{pod}$$

$$x_{head0} - x_{tail0} \geq \frac{1}{p_{spec}}\left(\frac{v_{head0}^3}{6} - \frac{v_{tail0}^2 v_{head0}}{2} + \frac{v_{tail0}^3}{3}\right) + L_{pod}$$

Figure 14:
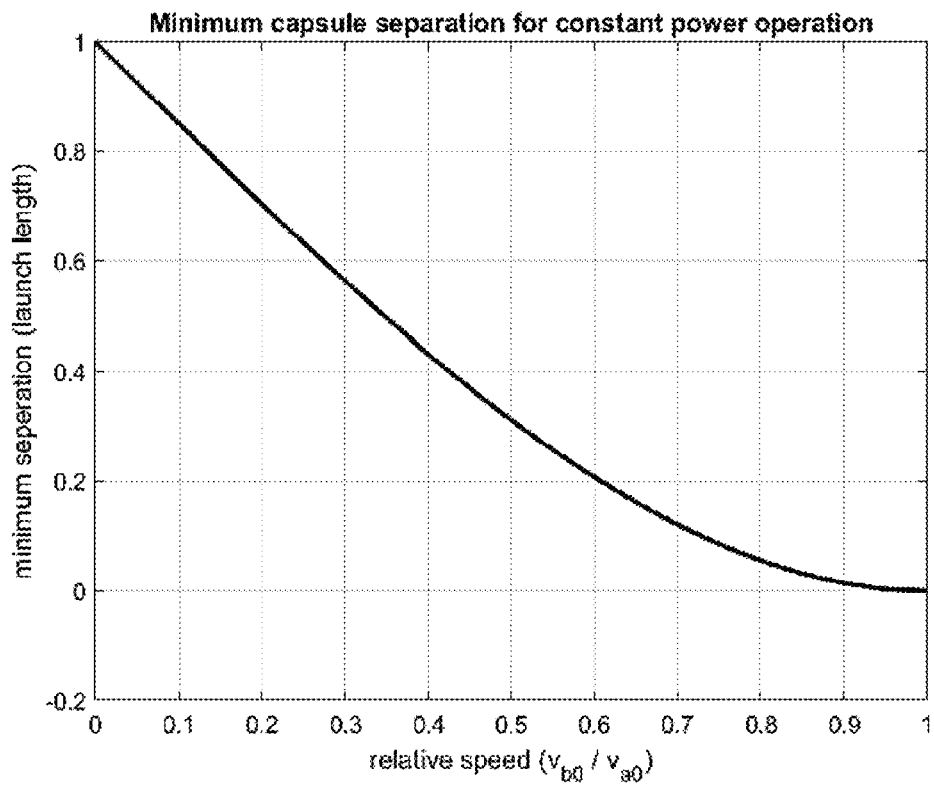
FIG. 14 illustrates minimum separation distance relative to required launch length as a function of initial speed difference between two capsules.

Equation (49) shows the distance required given two speeds, when assuming a continuous specific braking power $p_{spec}$ at the tail pod only, assuming that the head pod is coasting at a constant speed $v_{head}$. In case one needs to anticipate for a stopped pod, the safe distance becomes equal to $x_{cp1}$ in (22). FIG. 14 illustrates minimum separation distance relative to required launch length as a function of initial speed difference between two capsules according to equation (49).

An example case: suppose $v_{head}$=100 m/s and $v_{tail0}$=200 m/s, while p=400 kW and $m_c$=2000 kg, the required minimum separation distance according (49) becomes 4177 m, breaking time equals $T_{break}$=75 s, and distance travelled during braking: $(x_{tail1} - x_{tail0})$=11.7 km.

From equation (49) also results that in case the braking power is limited, the safe distance is inversely proportional to the available specific brake-power $p_{spec}$.

Safe Flow-Rate Limits

The tube traffic capacity can be described by the ratio of speed (m/s) divided by separation distance (m) yielding traffic flow rate $\Phi_{tube}$ in (vehicles/s). Using equation (49) an expression for the minimum flow-rate is found in (50):

$$\Phi_{tube} = \frac{v_{tail0}}{x_{head0} - x_{tail0}} \quad (50)$$

$$\Phi_{tube} = \frac{v_{tail0}}{\frac{1}{p_{spec}}\left(\frac{v_{head0}^3}{6} - \frac{v_{tail0}^2 v_{head0}}{2} + \frac{v_{tail0}^3}{3}\right) + L_{pod}}$$

$$\Phi_{tube}(v_{head0} = 0) = \frac{v_{tail0}}{\frac{1}{p_{spec}}\left(\frac{v_{tail0}^3}{3}\right) + L_{pod}} \approx 3\frac{p_{spec}}{v_{tail0}^2}$$

Figure 15:
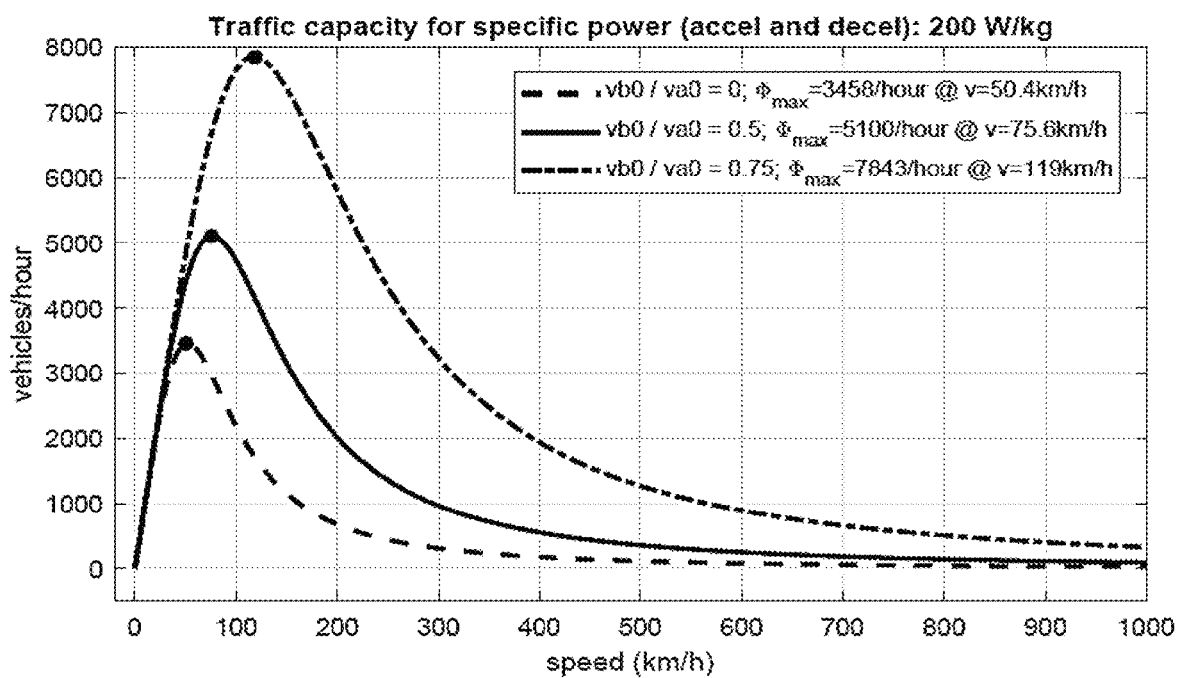
FIG. 15 illustrates an effect of assuming a speed of a preceding vehicle to be a certain fraction of an approaching vehicle.

FIG. 15 shows the effect of assuming the speed of the preceding vehicle to be a certain fraction of the approaching vehicle. The different traces depict the cases of standstill ($v_{head}$=0), case $v_{head}$=0.5$v_{tail}$ and case $v_{head}$=0.75$v_{tail}$.

Figure 16A:
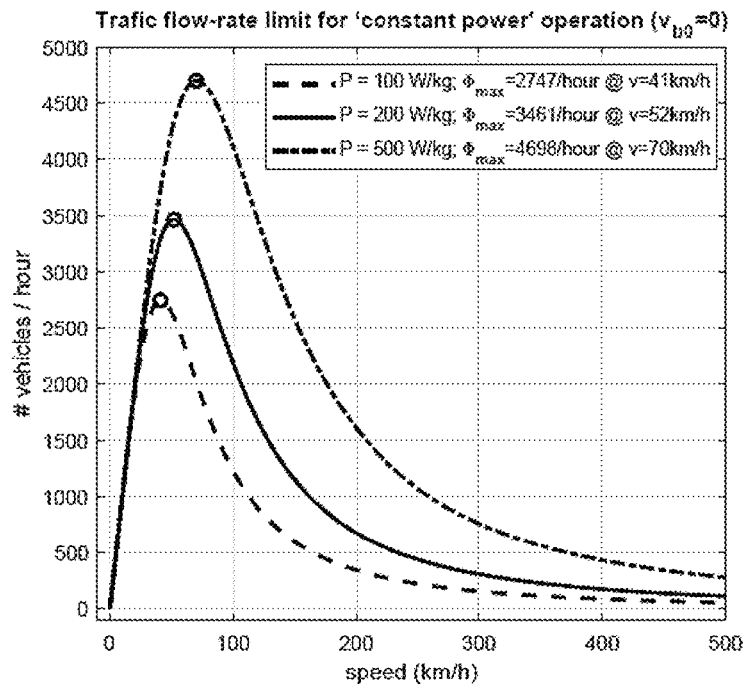
FIGS. 16a and 16b illustrates traffic flow-rate limits calculated for constant power approach and initial speed difference to predecessor.
Figure 16B:
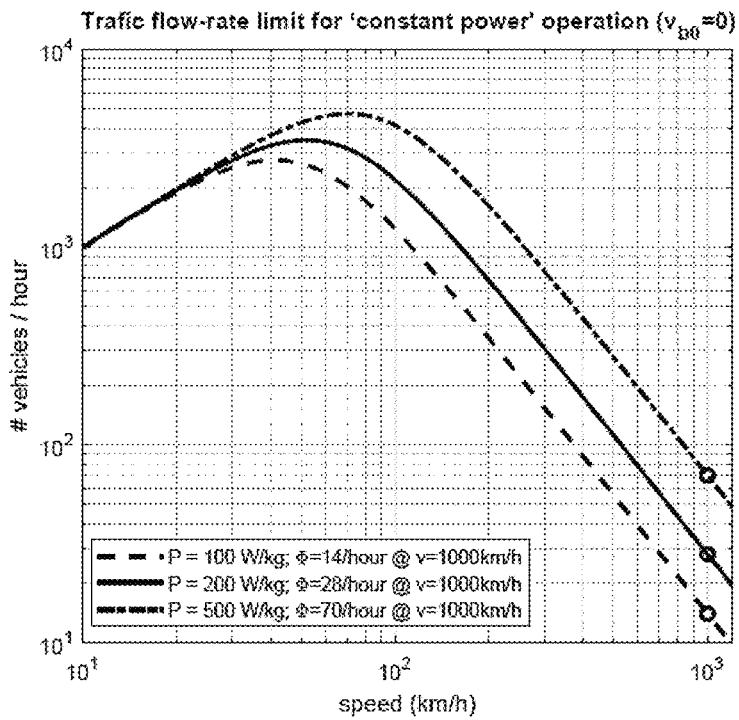

Equation (50) is calculated for $L_{pod}$=10 m, assuming the worst case that the first vehicle is standing still, resulting in FIGS. 16a-b, which illustrate traffic flow-rate limits calculated for constant power approach and initial speed difference to predecessor 100%. FIG. 16a shows the number of vehicles per hour versus the speed (km/h) depicted on a linear scale while FIG. 16b shows same on a double-logarithmic scale. No additional reaction time is taken into account, this is the absolute limit without emergency brakes.

These figures describe a curve that looks familiar from literature, where maximum flow-rates of about 2000 vehicles/h/lane around 80 km/h are mentioned for a typical freeway. Equation (50) shows the flow to be inversely proportional to the speed squared, which results in a mere 14 vehicles per hour in one tube when operating at a 1000 km/h top speed for the low specific-(breaking)-power.

Solutions to Achieve Sufficient Flow

FIG. 16 shows disappointing numbers at the higher speeds. Of course, nobody would want to reduce the speed of the pods too much to reach sufficient flow. Suppose the tube needs to compete with the TGV™ train from Rotterdam to Paris, i.e. 377 passengers, every 30 minutes, thus say 800 passengers/hour. The tollway to Paris has mainly 3 lanes which should be able to carry around 6000 vehicles per hour. When assuming 1.2 passengers per vehicle, the tollway's capacity in theory would be around 7200 passengers per hour this is about 9 times the number by high speed rail.

The 800 train-passengers per hour travel on a single track. Suppose we like to move 1000 passengers per hour and we assume a pod to carry 8 passengers, this would require 125 pods per hour to be launched. When supposing $p_{spec}$=100 W/kg, this flow-rate implies an absolute maximum pod-speed of 330 km/h which is comparable to the TGV.

However if one would want to match the tollway with just one tube in each direction, at least 1200 pods per hour would need to be launched. FIG. 16 implies that this capacity can only be reached safely at speeds between 10-101 km/h, no competitive speed for the tollway.

At an intended speed of one thousand kilometres per hour, FIGS. 16a-b yield a maximum number of vehicles, safely launchable in the tube, of 14 vehicles per hour. This simply implies that one vehicle should transport at least 72 passengers. In other words one vehicle should have at least 72 seats, small pods are not an option, however one may construct a train of coupled pods.

Having a large number of independent pods in one tube appears not safe and does not compete with only one high-speed prior art train track. Suppose we have pods with 8 passenger seats, then launching ten of these coupled as one 'pods-train' has many advantages: more time in the station to charge the battery and disembark and board passengers, less moving objects to track, smoother transitions from one track-type to the next (each pod control's its own coils and shares it's part of the total thrust or braking force).

A great advantage of the on-board inverter and on-board field oriented controller is the fact that the (control of the) active track does not need to be changed depending on the length of the train: each pod in the train takes care of its own part of the power and follows, like all other pods in the same train, a mutual command from traffic control. Using an automatic stator activation system, the total power supplied by the station to the train will just be proportional to the length of the train, keeping the power per unit length the same.

The flow capacity of an evacuated tube is often grossly overestimated. The flow of pods per hour is inversely proportional to the square of the travel-speed. FIGS. 16a-b show the impact of speed on safe-ow capacity. A way to achieve acceptable flow of one tube requires a significant amount of passengers, from dozens per launch, up to several hundred per launch. This implies using trains-of-pods or larger pods.

Using small pods, as generally advertised, will lead to impractically low traffic flow rate. Using much larger pods or launching the pods connected as proposed here is necessary to be able to match the passenger-flow of an existing high-speed rail.

Curves in the Track

The centripetal acceleration in a curve is described by:

$$a_t = \frac{v^2}{r} \quad (51)$$

The guidance system has limited transverse force capability and passengers don't like high sideways acceleration.

If a transverse acceleration needs to be limited to for example at <2 m/s², then a speed of 1000 km/h would result in a minimum curve radius of 39 km. Keeping speed predictable at each track location, matched banking of the track could result into more practical (smaller radius) and comfortable curves.

Implementation

To keep the controls simple, voltage-source feeding of the fixed stator of the LDFM is suggested, while the pod-coil is current-controlled in a field-oriented fashion. In this way both magnetizing current $i_d$ and thrust producing current $i_q$ can be controlled independently. LDFM and LSM only need $i_q$, LSReIM also needs $i_d$ to build up flux in the airgap. The fixed stator can be regarded as a source of flux with constant frequency, for the pod equivalent to a 'conveyor belt' of moving magnets.

Feeding the Active Stator

The active stator in the doubly-fed topology can be realized in many ways. It is best to control the stator such that it provides a fixed AC flux level to the pod's coils. Best is to feed all LDFM stator-coils in parallel with a source of voltage, either by actually connecting them in parallel, or by feeding each coil-set by a separate converter. Inductance is minimized this way, thereby maximizing the available system's peak power. FIG. 6 shows the way the coils could be configured and connected to a six-pulse converter with symbolically indicated switches 611-616.

Suppose each set of three coils is star-connected to a standard 6-pack IGBT module fed by 1000 V DC that can handle say 50 A per phase, then one 6-pack can feed around 1 m of track, assuming the total power supplied by the track to a pod being in the order of 50 kW/m. Any group of coils could be combined to make a favourable load of the chosen power converter(s). The advantage of the disclosure is that all power converters in the station and the first part of the launch can all operate at one fixed frequency and one fixed but not stabilized voltage level. This makes these converters extremely simple and inexpensive, they can even run in 6-step fashion (3 square waves phase shifted by 120).

The resulting flux and no-load currents become 6-step sine-like, yielding a switching frequency equal to the fundamental frequency, therefore minimizing switching losses and Electromagnetic Interference, EMI, frequencies between 100 Hz and about 2 kHz are feasible at this point, even direct connection to a 50 or 60 Hz 3-phase AC grid would be an option to regard. The converters along the active track could preferably only be activated when a pod is covering this particular converter-fed stator part.

The active part of the track may be limited to just the standstill or stop part of the track: in the stations. Its minimal length would be that of the longest expected train. Charging on-board batteries can be done in around 5 minutes, which would store sufficient energy on board to do the acceleration and the coasting over a long distance. Placing expensive active track for recharging somewhere halfway the track will be very uneconomic since the time presence is too small to convey sufficient energy to the fast moving pod. One would need an intermediate active track with a length of 16.7 km to obtain just one minute of charging capability. In each station, just a (few) hundred meters of active stator will do. Hence recharging while coasting is not recommended. Adding a few batteries to each pod will be much more practical and orders of magnitude less expensive, achieving the same goal: reach the destination safely and on time.

The LDFM stator can be excited in different ways: a single frequency, a variable frequency (DFM with adjustable flux), a zero frequency (LSM-like) or a short circuit (LIM-like). It is beneficial to use short sections of stator, driven by the same voltage and frequency to minimize unwanted series inductance. By means of a 'pod-present' signal, different sections of the stator could be switched on or off to minimize losses without a pod present.

The fixed stator can preferably be fed by six-pulse modulation: just switching twice per electrical period. By connecting the three phases in star (see FIG. 6), a segmented six-step sine-wave current results, sufficient for effective transfer of power to the pod. In this way all 'switchings' on the stationary converter will be 'soft' and its power-switches will have minimal losses. The frequency can be chosen to match the lamination quality and required flux-level in the airgap. In theory the stators could even be fed by 50 Hz, 60 Hz or 400 Hz 3-phase utility grid without the use of converters.

By exciting all coils that are covered by one or more pods, all pods will have full capability, also in a train-configuration.

Electric frequencies in the mover need to be able to vary over a wide range: plus and minus several hundred Hz to a few kHz depending on speed, pole-pitch and machine configuration. The feeding frequency of the LDFM stator can be chosen based on lamination quality and required airgap flux.

Specific thrust (N/m²) per motor-type determines the minimum size of the active air-gap.

On-Board Power Converter

A specific vehicle power around 100-200 W/kg is equivalent to present high performance full electric cars. The pole-pitch λ (separation distance between two magnetic poles) has great influence on the electric frequency $f_e$, see equation (52):

$$f_e = \frac{v_{podcoil}}{2\lambda} \tag{52}$$

As an example using λ=10 cm and $v_m$=278 m/s, $v_{shorecoil}$=0 yields $f_e$=1.39 kHz which is a very workable frequency which can even be reached with a 10 kHz switching frequency of the on-board power converter(s). Power converter modules that can directly connect to a high voltage battery (600-1000 V DC) and deliver the required power level of a few 100 kVA are commercially available components. Low cost existing hardware can be used, in combination with existing field-oriented control software for all stator types.

On-Board Battery

A Lithium-Ion-Polymer battery (LiPo) type is used as an example. Table 3 shows that the full launch under almost constant power takes about 3 minutes and uses about half the energy required for a 1000 km trip. This means that a battery with minimal storage capacity will be discharged at a current rate of around 0.5×60/3=10 C.

A LiPo battery being fully discharged in one hour (definition for 1C) delivers 200 W/kg. From first principles follows that battery-weight fraction and specific power of the pod determine the discharge current according:

$$i_{discharge} = \frac{p_{spec}}{200 k_{bat}} [C] \tag{53}$$

The example in Table 3 yields an 8 C discharge current (7.5 minute discharge time) which is well within the limits of LiPo cells.

EXAMPLE CALCULATION

The disclosure of the parallel fed fixed-frequency stator coils and LDFM, LSM and LSReIM tracks for charging, acceleration under constant power and coasting, using an on-board battery and a full-power on-board power converter is calculated for one special case that is close to a large automobile for convenience. Table 3 shows realizable figures with very low shear stress (in existing LSM rollercoasters >4N/cm² is common). This will keep the design energy-efficient, more linear from a magnetic perspective and easier to keep cool.

TABLE 3

Example performance of active vehicle on wheels

| Item | value | unit |
|---|---|---|
| Trip distance | 1000 | km |
| Cruise speed | 1000 | km/h (278 m/s) |
| Pod-mass (incl. 8 pass.) | 2000 | kg |
| Kinetic energy | 21.5 | kWh (77.2 MJ) |
| Travel time | 1:02 | hour (time while moving) |
| Battery-mass (LiPo) | 250 | kg (12.5%) |
| Pod-power | 400 | kW (200 W/kg) |
| Air pressure in tube | <100 | Pa |
| Coasting-power | 10 to 20 | kW (5 . . . 10 W/kg) |
| Accel distance | 36 | km |
| Accel time | 3:24 | min |
| Charging time | N × 2:24 | min (25 + N trains, 25 launches/hour) |
| Energy consumed | 10 . . . 20 | kWh (vacuum assumed) |
| Station power | 500 | kW × pods per train |
| Electric Frequency pod | −400 . . . 1390 | Hz (pole-pitch 0.1 m) |
| Electric Frequency stator | 400 | Hz or other constant value |
| LDFM length | 2 × 100 | m (≥2 × train-length) |
| LSM length | <2 × 36 | km (part LSRELM is an option) |
| LSRELM or IM length | 927.8 | km |
| wheel diameter | 1 | m (rough estimate) |
| wheel and IM speed | 5305 | rpm @ 1000 km/h |
| IM torque | 18 . . . 36 | Nm |
| pod length | 6 | m |
| coil height | 0.1 | m |
| thrust | 6 | kN (@ 3 m/s²) |
| shear stress | 1 | N/cm² |
| train length | 5 | pods (total 40 passengers/train) |
| Launches/hour | 25 | Safe distance (36 km): ≤28 |
| flow | 1000 | passengers/hour |
| e-milage | ≈2.5 | Wh/km per passenger |

The invention has been described herein with reference to several detailed examples. Those skilled in the art will appreciated that the invention is not limited to the disclosed embodiment. It shall also be understood that a preferred embodiment of the present disclosure can also be any combination of the dependent claims or above embodiments with the respective independent claim.

The invention claimed is:

1. A multi-mode drive system comprising a vehicle and a track, said track running from a first station to a second station remote from said first station, said first and second station arranged for at least one of boarding and de-boarding of said vehicle, said vehicle comprising an on-board rechargeable electrical energy storage device, wherein said vehicle and a first part of said track at said first and second station are arranged operating an electric Linear Doubly Fed Motor, LDFM, for launching said vehicle for moving along said track and charging said on-board energy storage device of said vehicle, and wherein said vehicle and a second part of said track between said first and second station are arranged operating a further electric motor different from an LDFM for at least one of accelerating, coasting and restarting movement of said vehicle for moving along said track after launching;
wherein said vehicle and said second part of said track are arranged operating said further electric motor comprising an electric Linear Synchronous Reluctance Motor, LSReIM; and
wherein said vehicle comprises an on-board electric coil and converter assembly, said second part of said track comprises a structure of alternating segments having different magnetic properties extending along a length of said second part of said track, and said on-board electric coil and converter assembly and said segments arranged comprising said LSReIM.

2. The multi-mode drive system according to claim 1, wherein said vehicle comprises an on-board electric coil and converter assembly electrically connected to said electrical energy storage device, and said first part of said track comprises a stationary electric coil and converter assembly extending along a length of said first part of said track, said assemblies arranged comprising said LDFM.

3. The multi-mode drive system according to claim 1, wherein said track comprises rails and said vehicle comprises wheels for moving along said rails, and said further electric motor comprises a rotary electric motor on-board of said vehicle and electrically connected to said electrical energy storage device, for rotating said wheels for moving said vehicle along said rails.

4. The multi-mode drive system according to claim 3, wherein said rotary electric motor is arranged for being switched off during operation of said LDFM.

5. The multi-mode drive system according to claim 1, wherein said vehicle and a third part of said track between said first and second station are arranged operating at least one of a Linear Synchronous Motor, LSM, and a Linear Induction Motor, LIM, said LSM arranged for further acceleration of said vehicle, wherein different type track parts comprising said third part of said track are separated over a distance.

6. The multi-mode drive system according to claim 1, wherein said on-board electrical energy storage device is arranged for being charged by at least one of an electric charging device at said first and second station, during launching of said vehicle operating said LDFM, and by regenerative power generated on-board of said vehicle operating said LDFM for braking movement of said vehicle.

7. The multi-mode drive system according to claim 1, wherein said system is arranged for moving said vehicle along said track between said first and second station in a tube with reduced air-pressure.

8. The multi-mode drive system according to claim 1, comprising a plurality of tracks, a plurality of first and second stations, and a plurality of vehicles, arranged for simultaneously driving a plurality of vehicles along a track.

9. A vehicle arranged for operating in a multi-mode drive system according to claim 1.

10. A track arranged for operating in a multi-mode drive system according to claim 1.

11. A method of operating a multi-mode drive system comprising a vehicle and a track, said track running from a first station to a second station remote from said first station, said first and second station arranged for at least one of boarding and de-boarding of said vehicle, said vehicle comprising an on-board rechargeable electrical energy storage device, wherein said vehicle and a first part of said track at said first and second station are arranged operating an electric Linear Doubly Fed Motor, LDFM, and wherein said vehicle and a second part of said track between said first and second station are arranged operating a further electric motor different from an LDFM, said method comprising:

operating said LDFM for launching said vehicle for moving along said track and charging said on-board energy storage device of said vehicle, and operating said further electric motor for at least one of accelerating, coasting and for restarting movement of said vehicle for moving along said track after launching;

wherein said vehicle comprises an on-board electric coil and converter assembly, said second part of said track comprises a structure of alternating segments having different magnetic properties extending along a length of said second part of said track, and said on-board electric coil and converter assembly and said segments are arranged comprising a Linear Synchronous Reluctance Motor, LSRelM.

12. The method according to claim 11 wherein said vehicle comprises the on-board electric coil and converter assembly electrically connected to said electrical energy storage device, and said first part of said track comprises a stationary electric coil and converter assembly extending along a length of said first part of said track, said assemblies arranged comprising said LDFM, said method further comprising operating said stationary electric coil and converter assembly at a constant frequency and operating said on-board electric coil and converter assembly for generating coil currents in a field-oriented fashion.

13. The method according to claim 11, wherein during at least one of accelerating and decelerating of said vehicle said on-board electrical energy storage device is predominantly operated at constant electrical power.

* * * * *